United States Patent [19]

Schulz

[11] Patent Number: 5,648,967
[45] Date of Patent: Jul. 15, 1997

[54] METHOD AND ARRANGEMENT FOR TRANSMITTING INFORMATION IN A DIGITAL RADIO SYSTEM

[75] Inventor: Egon Schulz, Munich, Germany

[73] Assignee: Siemens Aktiengesellschaft, Munich, Germany

[21] Appl. No.: 399,037

[22] Filed: Mar. 6, 1995

[30] Foreign Application Priority Data

Mar. 7, 1994 [DE] Germany .................. 44 07 530.8

[51] Int. Cl.$^6$ .................................................. H04J 3/02
[52] U.S. Cl. .................... 370/328; 370/347; 370/442
[58] Field of Search ........................ 370/18, 19, 20, 370/50, 95.1, 95.3, 84, 85.7; 375/260

[56] References Cited

U.S. PATENT DOCUMENTS

| | | | |
|---|---|---|---|
| 4,763,325 | 8/1988 | Wolfe et al. | 370/104 |
| 4,881,241 | 11/1989 | Pommier et al. | 375/260 |
| 5,228,025 | 7/1993 | Le Floch et al. | 370/20 |
| 5,274,629 | 12/1993 | Helard et al. | 370/50 |
| 5,289,471 | 2/1994 | Tanaka et al. | 370/95.3 |
| 5,327,429 | 7/1994 | Dartois et al. | 370/82 |
| 5,329,548 | 7/1994 | Borg | 370/50 |
| 5,416,801 | 5/1995 | Chouly et al. | 370/50 |
| 5,511,110 | 4/1996 | Drucker | 370/95.1 |
| 5,533,004 | 7/1996 | Jasper et al. | 370/84 |
| 5,546,400 | 8/1996 | Hironaka | 370/95.1 |

FOREIGN PATENT DOCUMENTS

| | | |
|---|---|---|
| 0 444 592 A2 | 4/1991 | European Pat. Off. . |
| 0 527 30 A1 | 2/1993 | European Pat. Off. . |
| 0 538 546 A1 | 4/1993 | European Pat. Off. . |
| WO92/06546 | 9/1991 | WIPO . |
| WO92/12481 | 12/1991 | WIPO . |

OTHER PUBLICATIONS

IBM Technical Disclosure Bulletin—vol. 24, No. 11B Apr. 1982.
8105 IEEE Transactions on Vehicular Technology 40 (1991) May, No. 2, New York, US Fast Adaptive Equalizers for Narrow–Band TDMA Mobile Radio.
Siemens D900 Mobile Communication System System Description SYD A30808–X3231–X–2–7618.

Primary Examiner—Douglas W. Olms
Assistant Examiner—Min Jung
Attorney, Agent, or Firm—Hill, Steadman & Simpson

[57] ABSTRACT

A method for transmitting information in a digital radio system, whereby the information are digitally coded block-by-block at the transmission side, and whereby the blocks are transmitted in channels, with each block being divided into a plurality of further blocks. Subsequently, each further block is transmitted over the digital radio system in a channel of a multi-channel composed of a plurality of channels. The transmission expediently occurs in channel-coded fashion with attachment of redundancy and is interleaved.

18 Claims, 21 Drawing Sheets

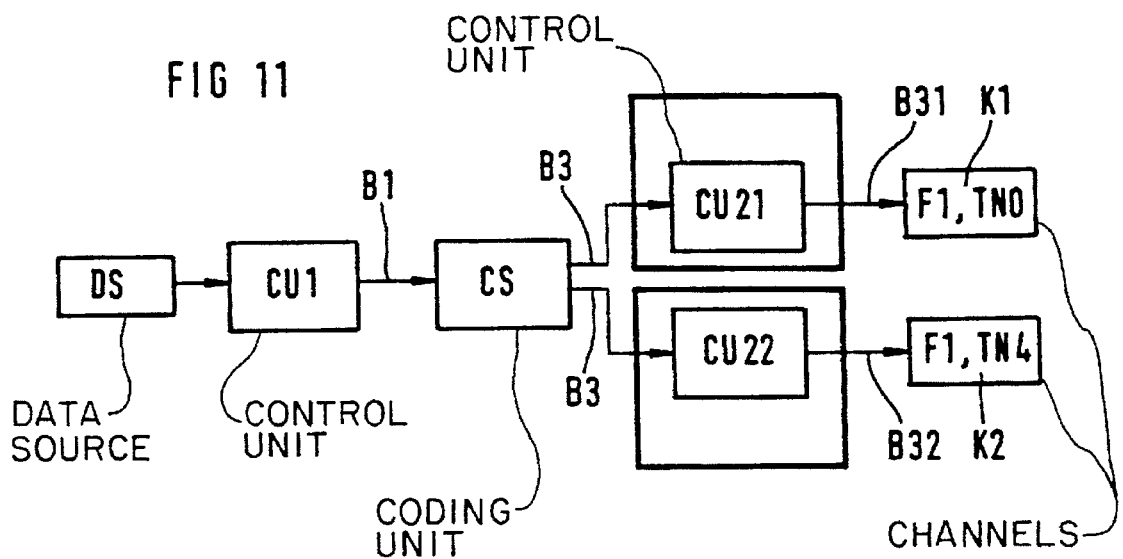
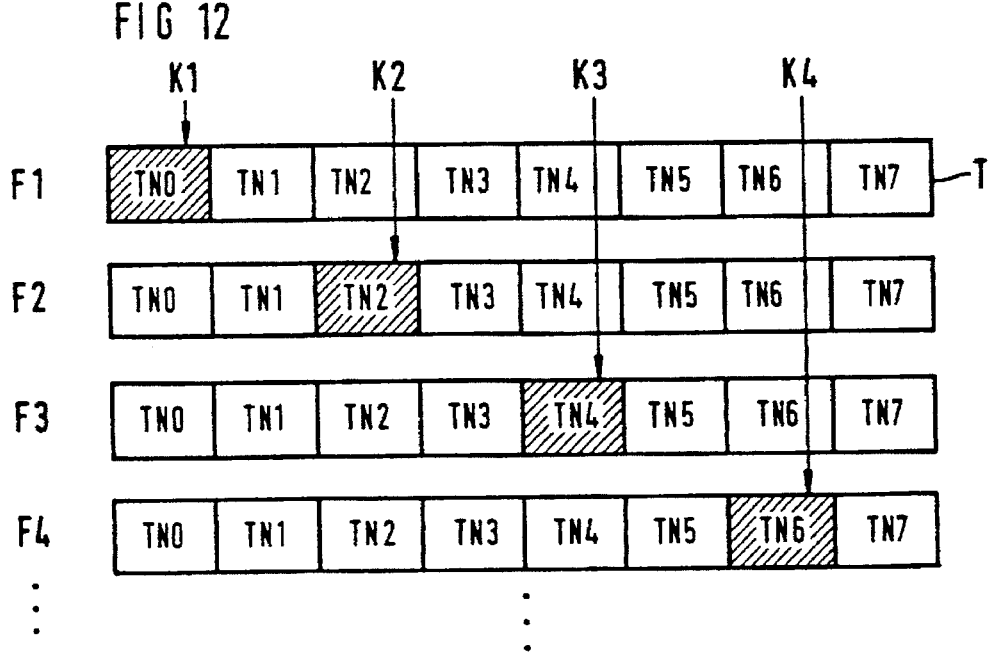

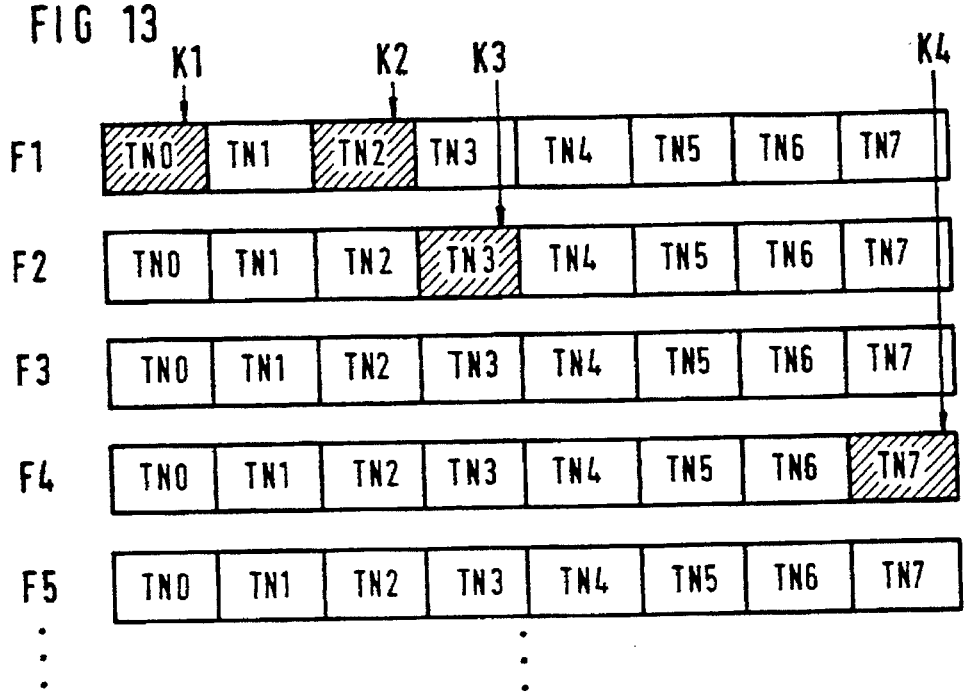
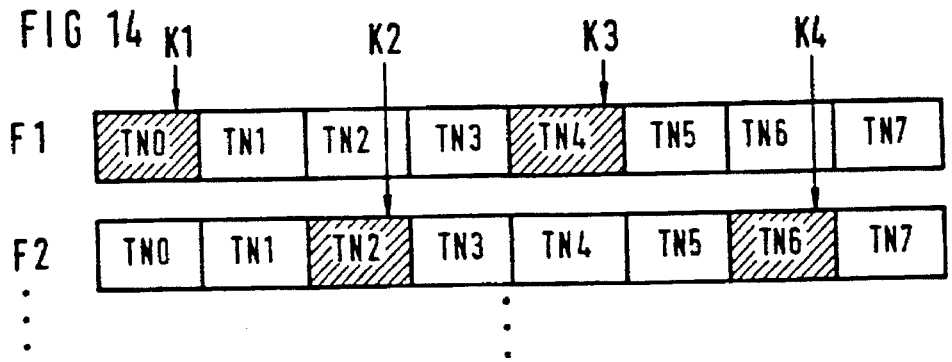
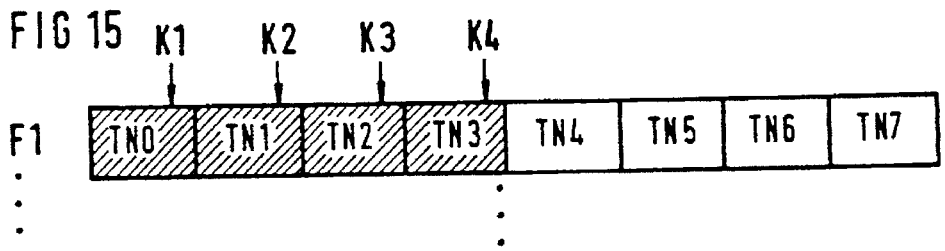

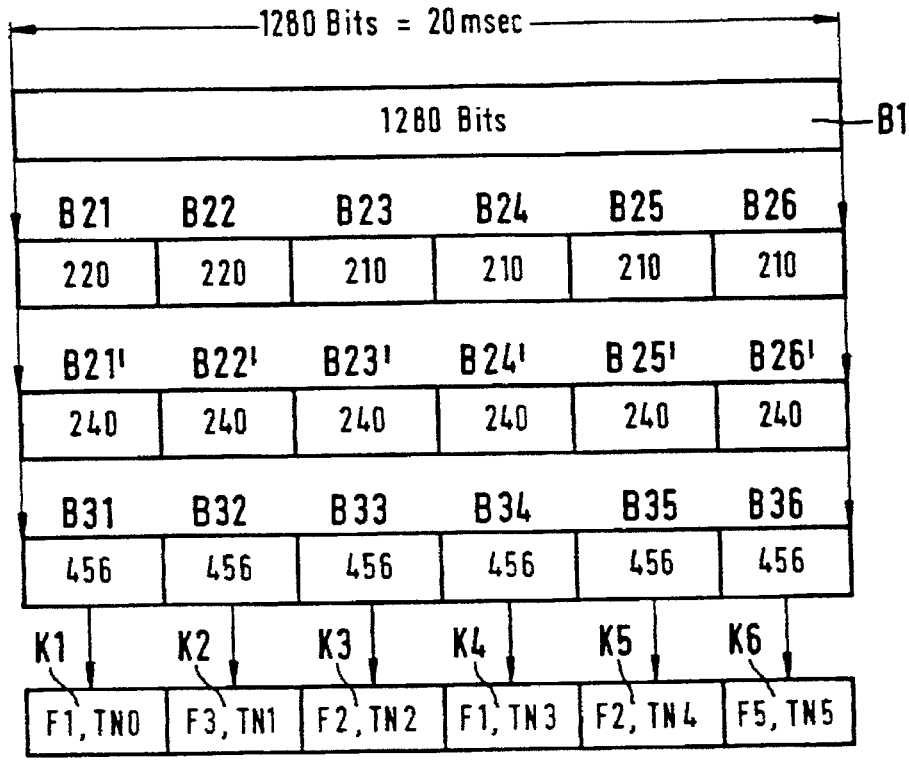
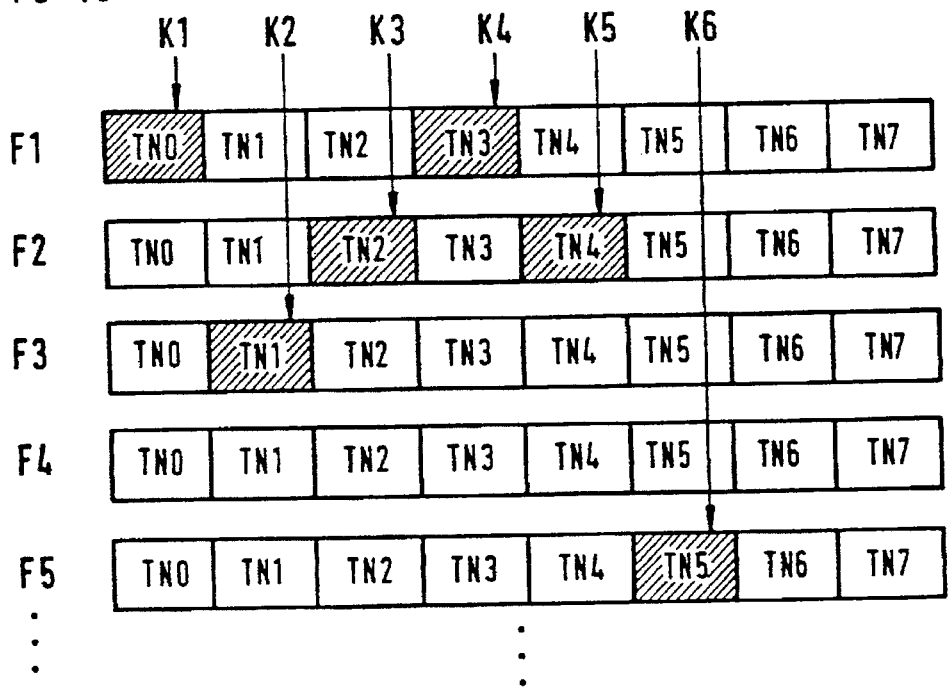

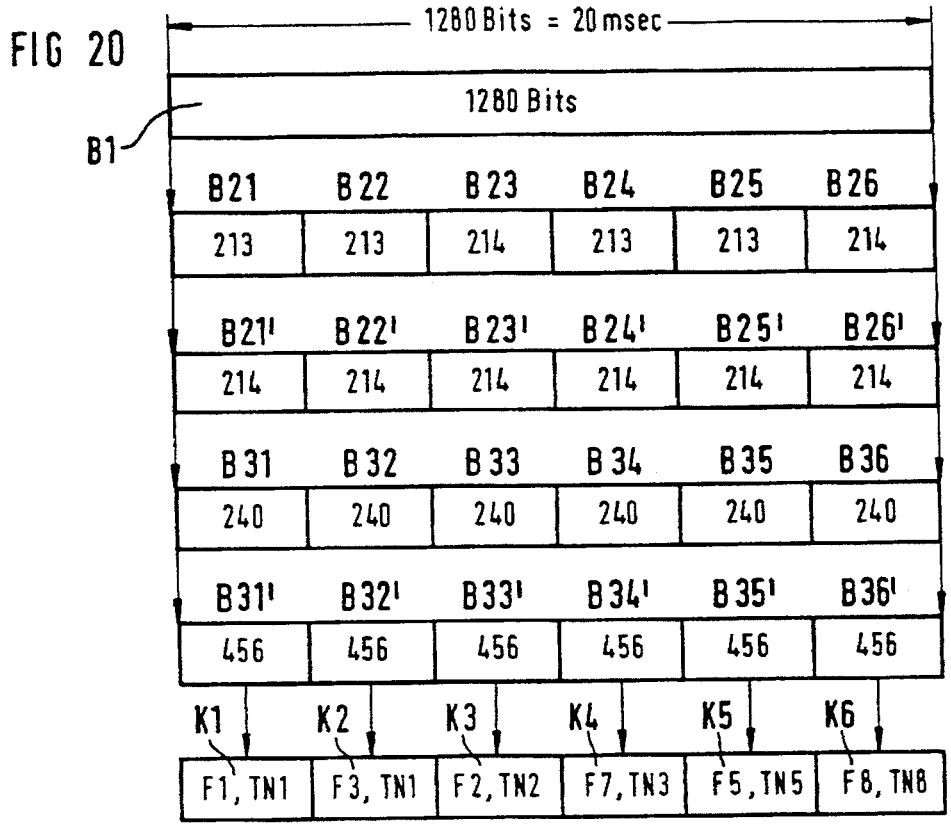
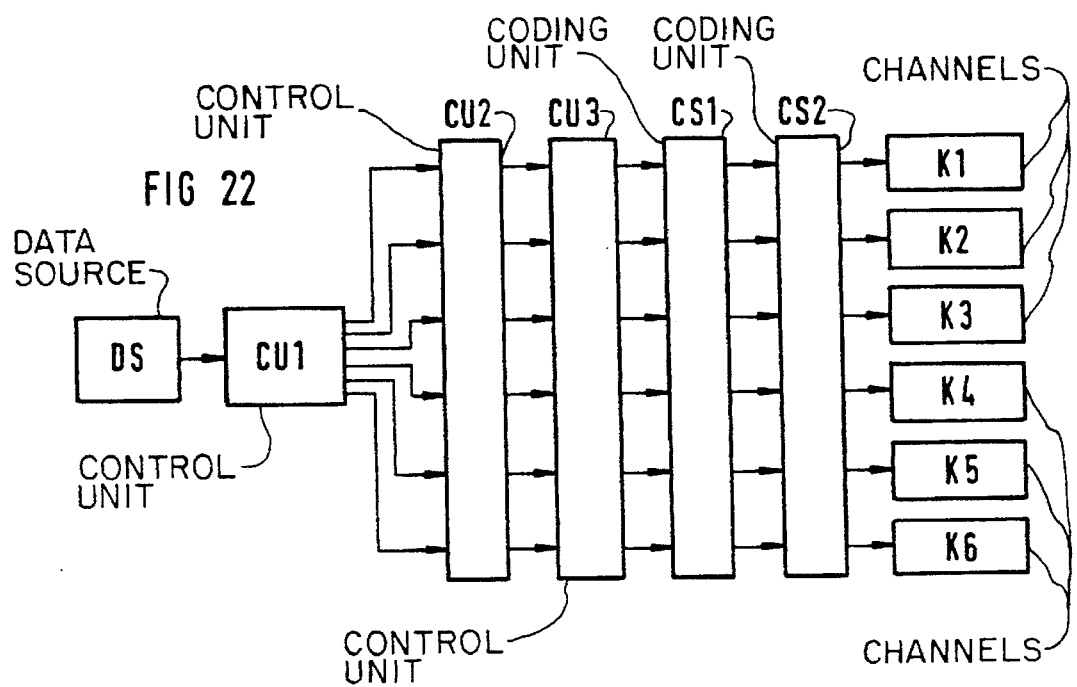

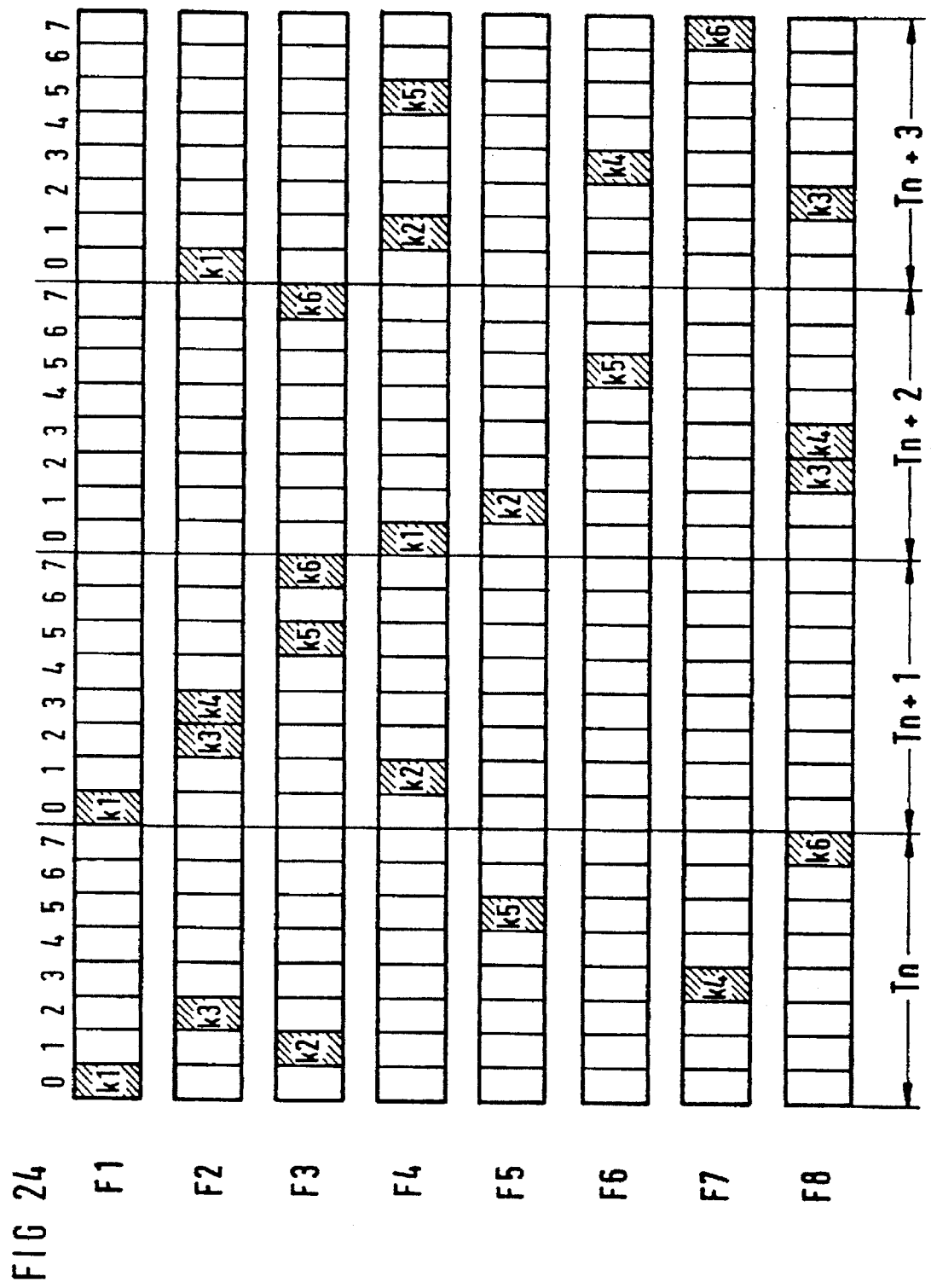

METHOD AND ARRANGEMENT FOR TRANSMITTING INFORMATION IN A DIGITAL RADIO SYSTEM

BACKGROUND OF THE INVENTION

The invention is directed to a method and to an arrangement for transmitting information in a digital radio system. The invention is also directed to a central station and to a subscriber station of a digital radio network.

The digital, cellular pan-European mobile radio system GSM (Global System for Mobile Communication) is an example of a digital radio system. In this system, the multiple access method TDMA (Time Division Multiple Access) is used, whereby the mobile radio telephone subscribers are differentiated by different time slots in a time-division multiplex system. The GSM is standardized for the 900 MHz range (GSM 900) and for the 180 MHz range (DCS 1800). In the GSM 900, the base stations receive and the mobile stations (MS) transmit in the frequency band from 890–915 MHz (referred to as bottom band), and the base stations transmit and the mobile stations receive in the frequency band from 935–960 MHz (referred to as top band). Further, one can also operate in an additionally specified frequency band G1 in the GSM 900, whereby the mobile stations transmit and the base stations receive in the top band from 880–890 MHz and the base stations transmit and the mobile stations receive in the bottom band from 925–935 MHz.

A top band from 1710–1785 MHz is provided for the DCS 1800 system wherein the mobile stations transmit and the base stations receive, and a bottom band from 1805–1880 MHz is provided wherein the base stations transmit and the mobile stations receive.

The frequency band width of a carrier (carrier frequency) in the GSM amounts to 200 kHz and each carrier having the band width of 200 kHz is divided into eight time slots. The GSM is thus a combination of the frequency-division multiple access method (FDMA) and the time-division multiple access method (TDMA). In this case, one speaks of an FDMA/TDMA system.

One data channel or one voice data channel is allocated to every mobile radio telephone subscriber in the GSM for the transmission of data or of digitized speech, whereby one data channel or one voice data channel is allocated to a time slot of a carrier. In order to protect the data stream against disturbances on the radio channel, a forward error correction FEC is implemented. Redundancy is thereby attached to the information (data or digitized speech) to be transmitted with the assistance of a channel coding. The attached redundancy serves the purpose of recognizing and correcting errors. The maximum gross transmission rate of a time slot that is composed of the information to be transmitted and of the attached redundancy amounts to a maximum of 22.8 kbit/s.

In the GSM, the digitized speech is transmitted with a net transmission rate of 13 kbit/s. 9.8 kbit/s redundancy is attached with the assistance of the channel coding for the error-protection of the digitized speech. In addition to the voice channels, there are channels in the GSM with different useful data rates, whereby, however, the maximum gross transmission rate, as already mentioned, amounts to 22.8 kbit/s. The channels existing in the GSM with the useful data rates of 12.0 kbit/s, 6.0 kbit/s or, respectively, 3.6 kbit/s have a redundancy of 10.8 kbit/s, 16.8 kbit/s or 19.2 kbit/s attached to them by the channel coding, so that a gross transmission rate of 22.8 kbit/s always results.

One disadvantage of this system is that a maximum error-recognizing and error-correcting transmission rate of only 12.0 kbit/s can be assigned to a radio telephone subscriber in the GSM in view of the transmission. If the redundancy were omitted, then a maximum, redundancy-free transmission rate of 22.8 kbit/s could be achieved in the GSM. The disadvantage given the omission of the redundancy, however, is that disturbances occurring during transmission, which result in bit errors, cannot be recognized and/or corrected.

SUMMARY OF THE INVENTION

An object of the invention is to enable a higher transmission rate in a radio system than the transmission rate maximally allowed in one channel.

According to the invention, a method and apparatus is provided for transmitting information in a digital radio system. Information items to be transmitted are digitally coded block-by-block at the transmission side. The blocks are transmitted in channels. The information items are subsequently recovered in turn from the transmitted blocks at the reception side. With the invention, each block is divided into a plurality of further blocks at the transmission side. Each further block is transmitted via the digital radio system in a channel of a multi-channel formed of a plurality of channels. The further blocks transmitted in the channels are in turn combined and output at the reception side.

According to the invention, it is not only one channel of the radio system that is provided for a transmission; rather, two or more channels, for example time slots of a time slot frame which need not necessarily lie on one and the same frequency, are combined to form a multi-channel of the radio system upon demand for a higher transmission rate, and these channels are assigned to the radio telephone subscriber for multi-channel operation.

Given the employment of a radio system that is designed as a time-division multiplex system, the structure of the time slot frame (TDMA frame) and of the time slots is preserved for the transmission. On the one hand, one can have recourse to existing channels, whereby the multi-channel is formed of the channels already defined in a system (for example, these are the 12 kbit/s, 5 kbit/s and 3.6 kbit/s channels in the GSM). On the other hand, channel-coding strategies already defined by the system and new strategies are used for the transmission on a multi-channel composed of a plurality of timeslots.

When there is the possibility, for example in a known mobile radio telephone system, of allocating not only one timeslot but two or more timeslots to a mobile radio telephone subscriber, i.e. a multi-timeslot of a timeslot frame of one or more carriers serving as multi-channel then a higher error-recognizing or error-correcting transmission rate or redundancy-free transmission rate than in the GSM can thus be transmitted.

When a multi-timeslot composed of two timeslots of a timeslot frame of one or more carriers is allocated to a mobile radio telephone subscriber, then double the maximum gross data rate of 22.8 kbit/s can be transmitted. A maximum, redundancy-free gross transmission rate of 45.6 kbit/s then results. When a 12.0 kbit/s channel already existing in the GSM is allocated to each timeslot of the multi-time slot composed of two timeslots, then a total of 24.0 kbit/s can be transmitted via the two timeslots which are error-protected. A multi-channel is thus formed of a multi-timeslot that is composed of a plurality of timeslots of a time slot frame of one or more carriers on which the information items are transmitted. For example, compressed video signals can be transmitted as information, these not being capable of being transmitted via a single channel.

When the multi-channel is composed of three timeslots of a timeslot frame, then the mobile radio telephone subscriber has a maximum redundancy-free gross data rate of 68.4 kbit/s available. One has the possibility of transmitting 64.0 kbit/s in error-protected fashion via a multi-channel formed of three timeslots, whereby 4.4 kbit/s can be employed for error-recognizing or error-correcting redundancy. On the other hand, 36.0 kbit/s can also be transmitted in error-protected fashion when one 12.0 kbit/s channel is allocated to every timeslot. Of course, there is also the possibility of allocating a combination of channels already existing in the GSM to the three timeslots. A mixed combination is composed, for example, of assigning one 12 kbit/s channel to two time slots and one 6 kbit/s channel to one timeslot. An error-protected transmission rate of a total of 30 kbit/s thus results for the multi-channel formed of three timeslots.

When the multi-channel is composed of four timeslots of a timeslot frame, then the radio telephone subscriber has a redundancy-free maximum gross data rate of 91.0 kbit/s available. If one wished to transmit a net data rate of 64.0 kbit/s over, for example, a multi-channel formed of four timeslots, then 27.6 kbit/s remain for attaching error-recognizing or error-correcting redundancy.

The advantage of using channels that already exist in the formation of a multi-channel is that structures and definitions that already exist can be employed, and development costs can thus be eliminated.

Exemplary embodiments of the invention shall be set forth in greater detail below with reference to the drawing figures.

BRIEF DESCRIPTION OF THE DRAWINGS

FIG. 11 is a transmission arrangement for the transmission of a multi-channel having a transmission rate of 24.0 kbit/s, whereby a common channel coding is provided;

FIG. 12 is a multi-channel for a transmission rate of 48.0 kbit/s formed of four timeslots on four different frequencies;

FIG. 13 is a multi-channel for a transmission rate of 48.0 kbit/s formed of four timeslots on three different frequencies;

FIG. 14 is a multi-channel for a transmission rate of 48.0 kbit/s formed of four timeslots on two different frequencies;

FIG. 15 is a multi-channel for a transmission rate of 48.0 kbit/s formed of four timeslots on one frequency;

FIG. 17 shows the coding of a channel having a transmission rate of 64.0 kbit/s;

FIG. 18 is a multi-channel for a transmission rate of 64.0 kbit/s formed of six timeslots on four frequencies;

FIG. 20 is a further coding of a channel having a transmission rate of 64.0 kbit/s;

FIG. 22 shows a further transmission arrangement for a multi-channel for a transmission having a transmission rate of 64.0 kbit/s;

FIG. 24 shows a coding for a multi-channel formed of six timeslots of a timeslot frame, this multi-channel being capable of hopping over eight frequencies;

DESCRIPTION OF THE PREFERRED EMBODIMENTS

Figure 1:
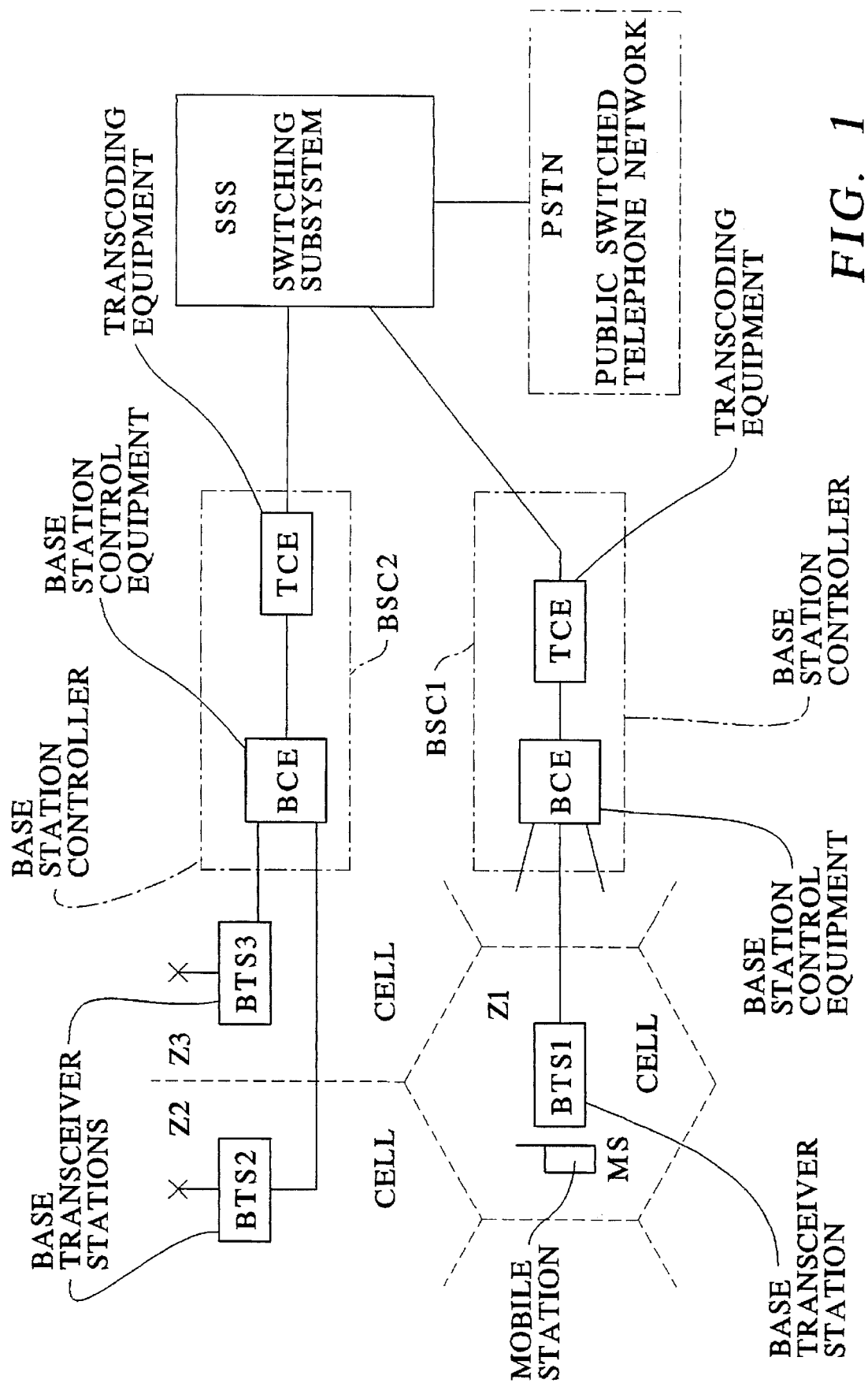
FIG. 1 is a block circuit diagram of a known mobile radio telephone system.

In the radio system shown in FIG. 1, a coverage area of a mobile radio telephone system operating according to what is referred to as the GSM standard (GSM means Global System for Mobile Communication) is divided into a plurality of cells Z, only the cells Z1–Z3 thereof being referenced in FIG. 1. The telecommunication service from and to a mobile station MS is offered by a base transceiver station BTS in such a cell Z. In FIG. 1, only the base transceiver stations BTS1–BTS3 allocated to the cells Z1–Z3 are shown. One or more base transceiver stations BTS are connected to a base station controller BSC, only the base station controllers BSC1 and BSC2 thereof being shown in FIG. 1. The station controllers BSC implement the local functions of call switching, monitoring and maintenance. They comprise base station control equipment BCE and transcoding equipment TCE. A plurality of base station controllers BSC are connected to a switching subsystem SSS which is in turn connected to the public network PSTN (PSTN means Public Switched Telephone Network) that can be designed as an ISDN network, as a mobile radio telephone network or as some other telephone or data network. For example, such a system is described in a publication of Siemens AG, D900 Mobile Communication System, System Description, 1992.

When a subscriber having the mobile station MS serving as a subscriber station in the cell Z1 wishes to communicate with another subscriber, then a predetermined protocol is sequenced via the base transceiver station BDS1 with the base station controller BSC1, this protocol being defined, for example, in the afore-mentioned GSM standard. When the connection between the mobile station MS and the base station controller BSC1 is set up, a connection to the public network PSTN is produced via the switching subsystem SSS. Proceeding from the public network PSTN, the other subscriber, who can in turn be provided with a mobile station, is then reached.

Figure 2:
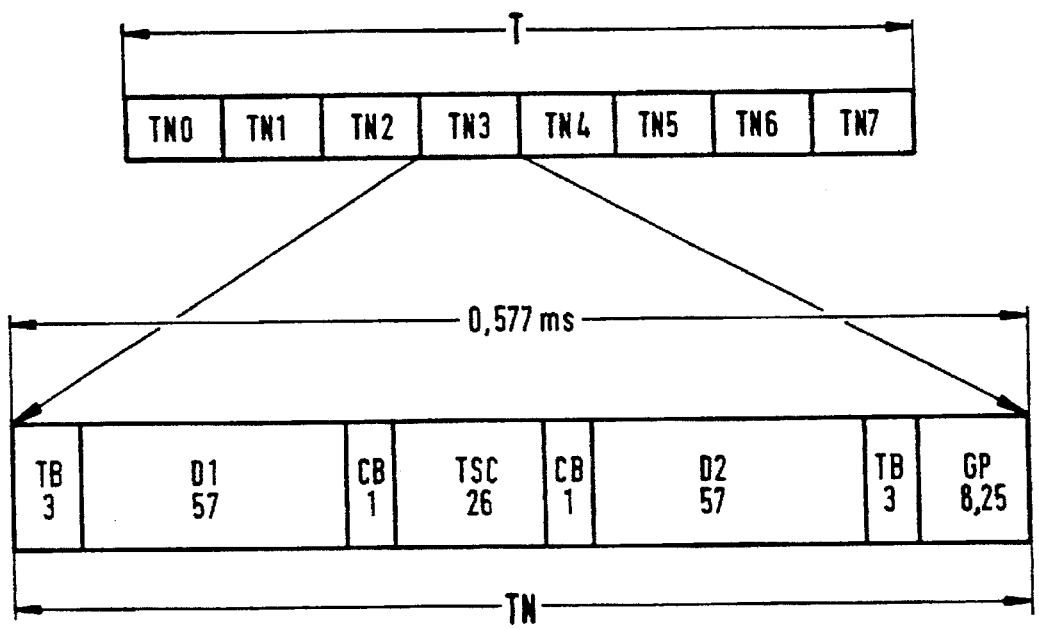
FIG. 2 shows the structure of a timeslot frame.

FIG. 2 shows the structure of a timeslot frame T having eight timeslots TN0–TN7, whereby one timeslot frame (TDMA frame) has a duration of 4.615 ms. Each timeslot has a duration of approximately 0.577 ms or 156.25 bits. The physical content of a time slot is referred to as a burst. There are four different types of burst in this system:

1. Normal burst: this burst is used in order to transmit data, voice or monitoring or control information.

2. Frequency correction burst: this burst is used for the frequency synchronization of the mobile station.

3. Synchronization burst: this burst is used for the frame synchronization of the mobile station.

4. Access burst: this burst is used for the initial access of the mobile station and in a handover of the mobile station.

FIG. 2 shows in enlarged fashion a normal burst TN having a duration of 0.577 ms. It contains 114 encoded or non-encoded information bits, dependent on whether an encoding function is activated or not. These bursts are divided into two half-bursts D1 and D2 each having respectively 57 bits. A training sequence TSC that is 26 bits long is located in the middle of the normal burst, this training sequence TSC serving the purpose of measuring the channel and/or of estimating the channel pulse reply of the transmission channel. A respective control bit CB that indicates whether the normal burst contains data or control information is located at both sides of the training sequence TSC. When the left control bit is set, then the uneven information bits contain control information and the even-numbered information bits contain data. When the right-hand control bit is set, then the even-numbered information bits contain control information and the odd-numbered bits contain data. When, by contrast, both control bits are set, then the normal burst contains only control information. A normal burst begins and ends with respectively three defined tail bits TB. A normal burst terminates with a guard period GP of 8.25 bits.

Figure 3:
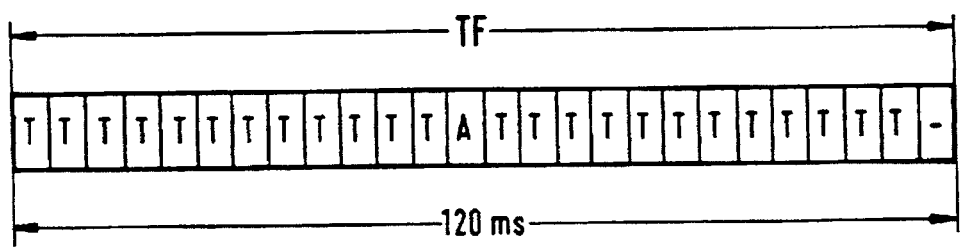
FIG. 3 is a frame formed of 26 timeslot frames.

The traffic data channels in the GSM are arranged in a frame TF composed of 26 timeslot frames (26-frame multiframe), as shown in FIG. 3. Data, digitized speech or control information are transmitted in 12 successive timeslot frames T, namely the timeslot frames 0–11 and timeslot frames 13–24. The timeslot frame 12 serves the purpose of transmitting control information A such as, for example, parameters for the adaptive power control of the corresponding mobile radio telephone subscriber, frequencies of the neighboring cells, etc., and cell-specific information. No data are transmitted in time slot frame 25. The frame shown in FIG. 3 corresponds to a duration of 120 ms.

Useful information can thus be transmitted in 24 of the 26 timeslot frames T. Since 114 bits (normal burst) can be transmitted in each timeslot, 114.24=2736 information bits can thus be transmitted during a frame lasting 120 ms. This corresponds to a gross data rate of 22.8 kbit/s.

Figure 4:
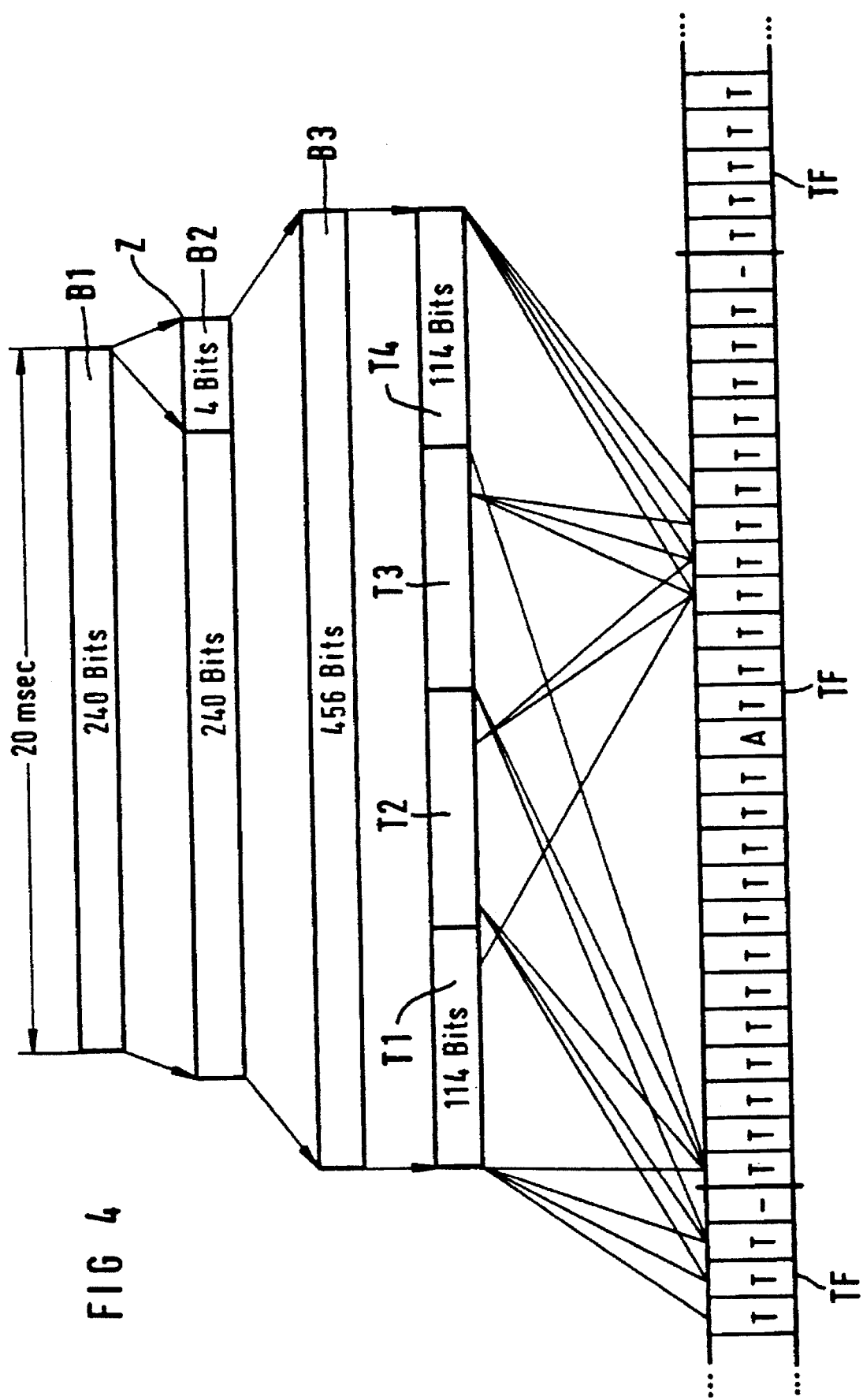
FIG. 4 shows the coding of a channel with a transmission rate of 12.0 kbit/s.

Given the channel coding and interleaving of a channel with a transmission rate of 12.0 kbit/s shown in FIG. 4, blocks B1 of 240 bits are formed, these respectively corresponding to a duration of 20 ms. Each block B1 is expanded by four defined auxiliary bits Z to form a block B2 and is subsequently channel-coded. The channel-coding is implemented with the assistance of a convolution code having the information rate $R=\frac{1}{2}$ and having the memory length $K=4$. As a result thereof, a total of 488 bits derive. After the channel coding, 32 bits that are not transmitted are deleted from the channel-coded block 32. A block B3 having 456 bits thus results therefrom. These 456 bits are reordered and divided into four sub-blocks T1–T4 of 114 bits each. Each sub-block T1–T4 is then divided into 19 data blocks of six bits each. One data block composed of six bits is transmitted in each timeslot available for the transmission, so that at least 19 timeslot frames T are required for the transmission of a sub-block T1–T4 that is 114 bits long. In this case, one speaks of an interleaving depth of 19. Since the transmission of a sub-block T1–T4 having a size of 114 bits given the 12.0 kbit/s channel respectively begins one time slot frame T later compared to the preceding sub-block, at least 22 timeslot frames T are required for the transmission of 456 bits in the 12.0 kbit/s channel.

Figure 5:
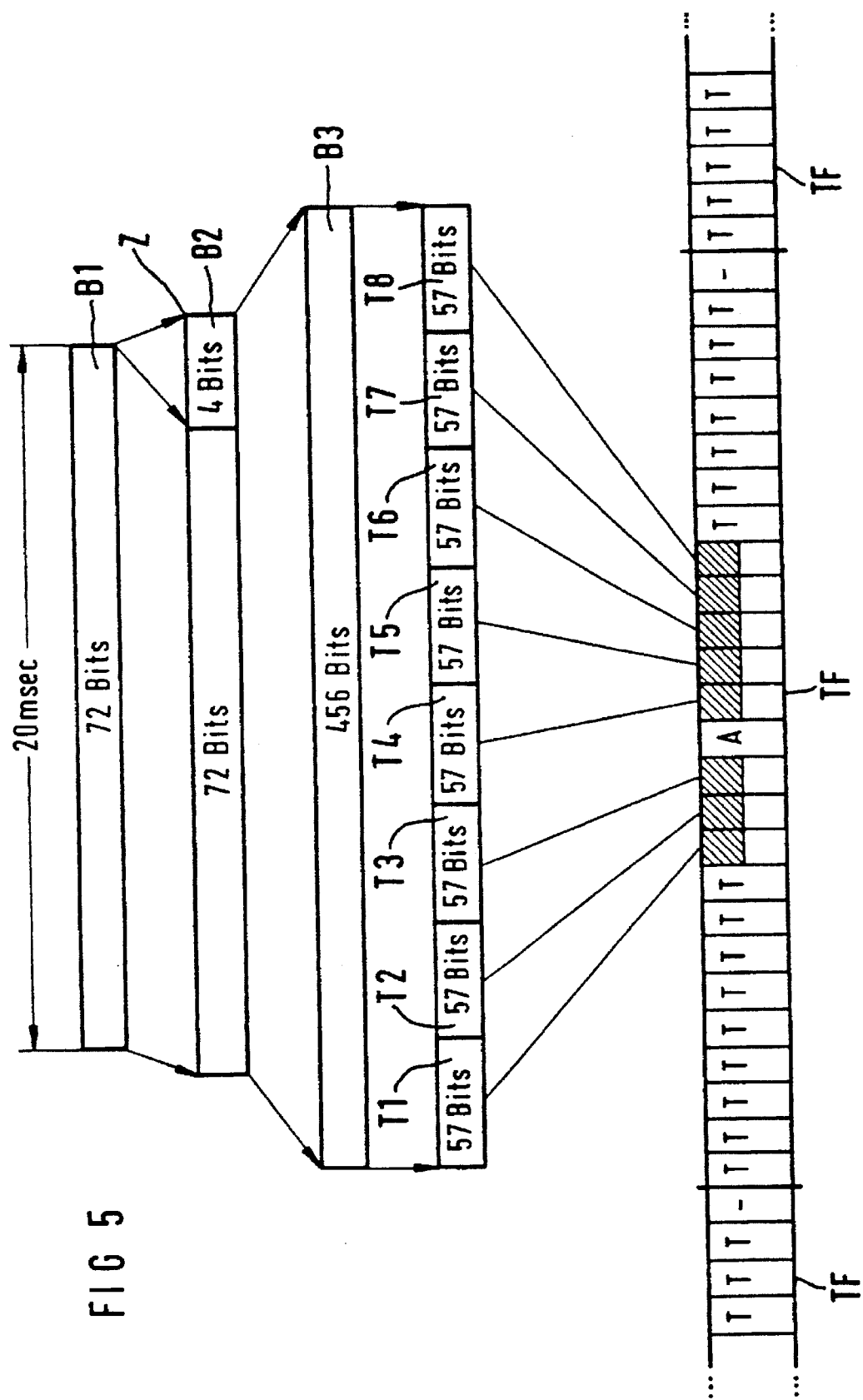
FIG. 5 shows the coding of a channel with a transmission rate of 3.6 kbit/s.

Given the channel coding and interleaving of a channel with a transmission rate of 3.6 kbit/s shown in FIG. 5, blocks B1 of 72 bits are formed, these corresponding to 20 ms. Four auxiliary bits Z are attached to every block B1 in order to generate a block B2. The latter is subsequently channel-coded with a convolution code. The convolution code has the code rate $R=\frac{1}{2}$ and the memory $K=4$. 384 bits of redundancy are thus attached to the 72 bits by the channel coding. The channel-coded block B3 having 456 bits is then divided into 8 sub-blocks T1–T8 of 57 bits each and a respective sub-block T1–T8 is transmitted in a timeslot of a timeslot frame T, as shown in FIG. 5.

As a result of the high redundancy, the 3.6 kbit/s channel is more resistant to disturbances when compared to the 12.0 kbit/s channel. A higher error-protected transmission excepting speech with 13 kbit/s) than with a net data rate of 12.0 kbit/s a gross data rate of 22.8 kbit/s is not provided in the GSM system.

However, a higher data transmission rate can be achieved when two or more time slots TN of a timeslot frame T on the same or on different frequencies are allocated to a subscriber.

If, for example, one wished to have an error-protected channel for the transmission of 24.0 kbit/s, then a multichannel formed of two timeslots TN is allocated to the subscriber, whereby an error-protected channel having a transmission rate of 12.0 kbit/s is arranged at each timeslot TN. The one 12.0 kbit/s channel K1, for example, can thereby be arranged at the timeslot TN0 of a frequency F1 and the other 12.0 kbit/s channel K2 can be arranged at the timeslot TN4 of the frequency F5 of the same timeslot frame T, as shown in FIG. 6.

Figure 7:
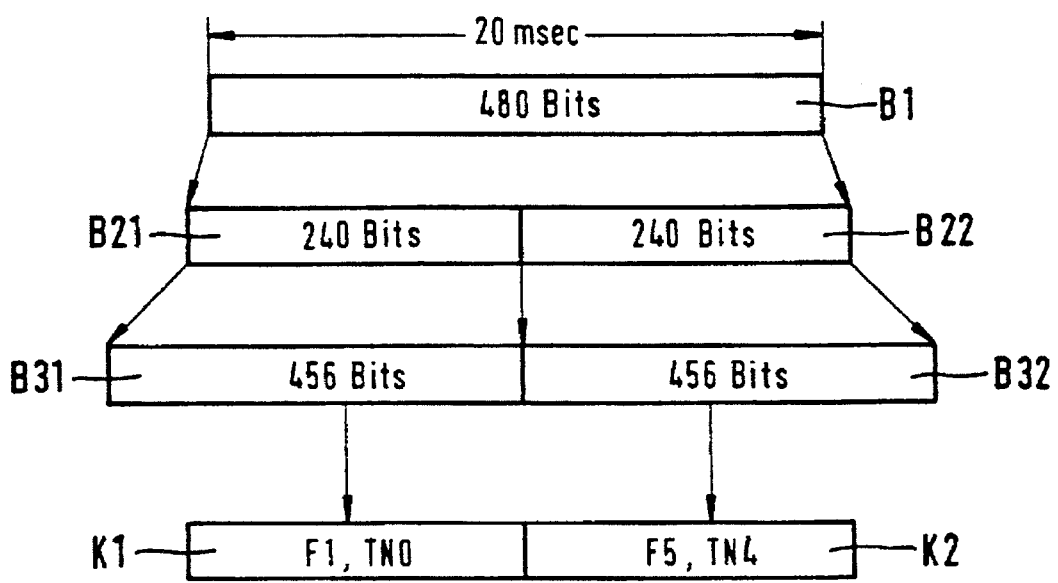
FIG. 7 illustrates the coding of a channel having a transmission rate of 24.0 kbit/s.
Figure 8:
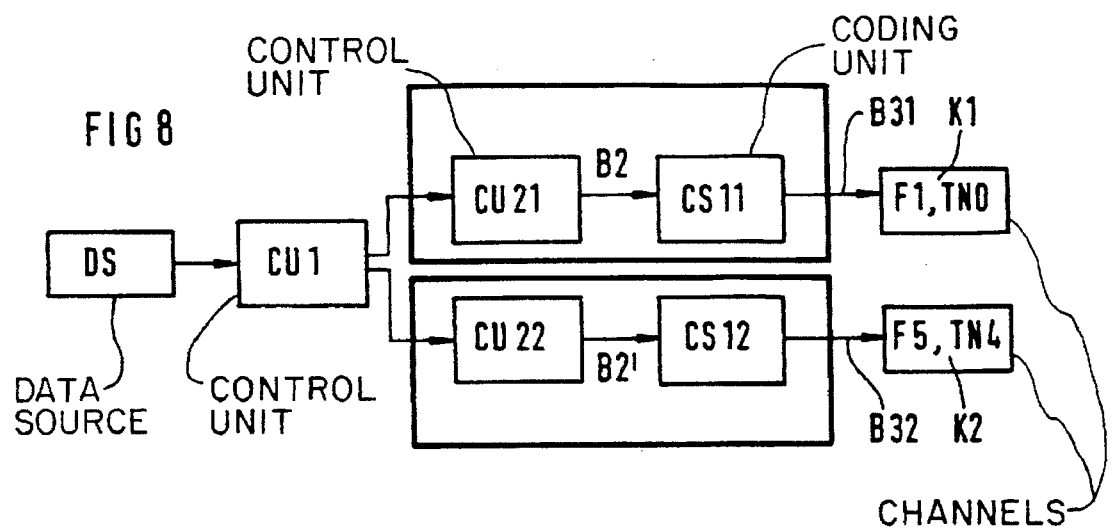
FIG. 8 shows a transmission arrangement for the transmission of a multi-channel having a transmission rate of 24.0 kbit/s.

Given the transmission with a transmission rate of 24.0 kbit/s shown in FIGS. 7 and 8, a data source DS supplies a data stream of 480 bits every 20 ms, this data stream being shaped with a control unit CU1 into a respective block B1. The block B1 is divided in respective control units CU21 and CU22 into two data blocks B21 and B22 having 240 bits each. Each data block B21 and B22 is then supplied to a coding unit CS11 or CS12 for a channel coding and for an interleaving for a 12.0 kbit/s channel K1 or, respectively, K2 in order to form blocks B31 and B32. Each 12.0 kbit/s channel K1 or K2 is then allocated to a time slot TN of the multi-channel formed of two timeslots F1, TN0 or F5, TN4.

Figure 6:
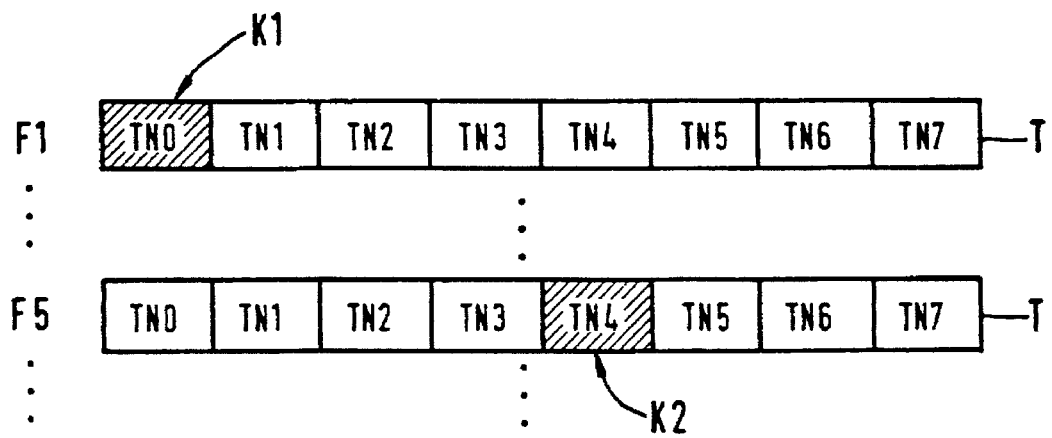
FIG. 6 illustrates a multi-channel formed of two timeslots on different frequencies.

It is shown by way of example in FIGS. 6–8 that the channel K1 is allocated to the timeslot TN0 at frequency F1 and the channel K2 is allocated to the timeslot TN4 at frequency F5.

Figure 9:
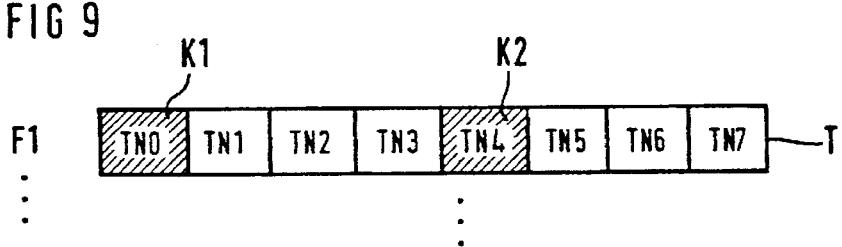
FIG. 9 illustrates a multi-channel formed of two timeslots on the same frequency.

Given the configuration shown in FIG. 9, the two channels K1 and K2 are arranged by way of example on the same frequency F1. The channel K1 occupies timeslot TN0 therein and the channel K2 occupies timeslot TN4 therein.

Figure 10:
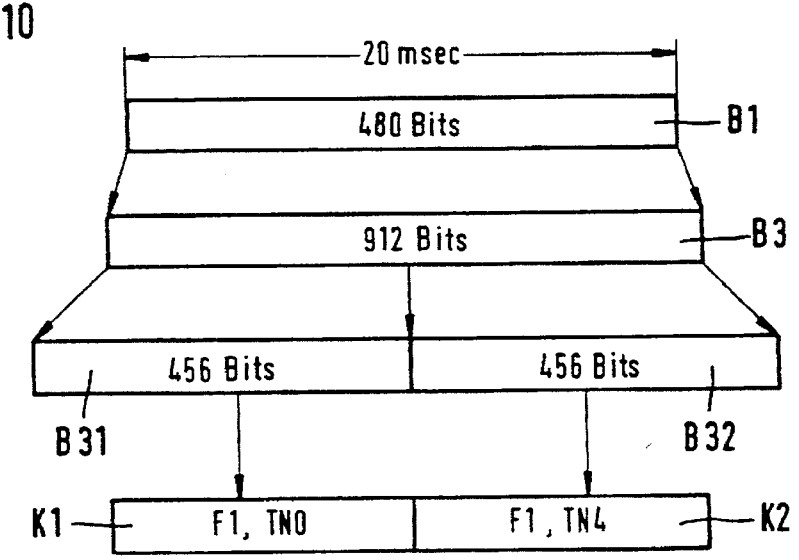
FIG. 10 shows the further coding of a channel having a transmission rate of 24.0 kbit/s.

FIGS. 10 and 11 show another possibility for the transmission of 24.0 kbit/s. The control unit CU1 respectively forms a block B1 of 480 bits that the data source DS supplies every 20 ms. This block B1 is channel-coded in the coding unit, so that a channel-coded block B3 having 912 bits is respectively obtained. The channel-coded block B3 is then divided in the control units CU21 and CU22 into two sub-blocks B31 and B32 of the same size, and every sub-block B31 and B32 having 456 bits is allocated to a channel K1 and K2 of a multi-channel, whereby each sub-block B31 and B32 is interleaved over a plurality of timeslots. The division of the multi-channel formed of two channels K1 and K2 likewise occurs, for example, according to the illustration in FIG. 9.

As shown in FIGS. 12–15, multi-channels that are composed of four channels (time slots) K1–K4 of a timeslot frame can be formed for an error-protected transmission of 48.0 kbit/s upon utilization of the available, error-protected 12.0 kbit/s channels. Different configurations are thereby employed, as shown by way of example in FIGS. 12–15.

For example, the four channels K1–K4 are uniformly divided in FIG. 12 onto four frequencies F1–F4 of timeslot frames T. In FIG. 13, the four channels K1–K4 are distributed onto three frequencies F1, F2 and F5 of timeslot frames T; and, in FIG. 14, the four channels K1–K4 are divided onto two frequencies F1 and F2. In FIG. 15, the four channels K1–K4 are arranged on only one frequency F1.

Figure 16:
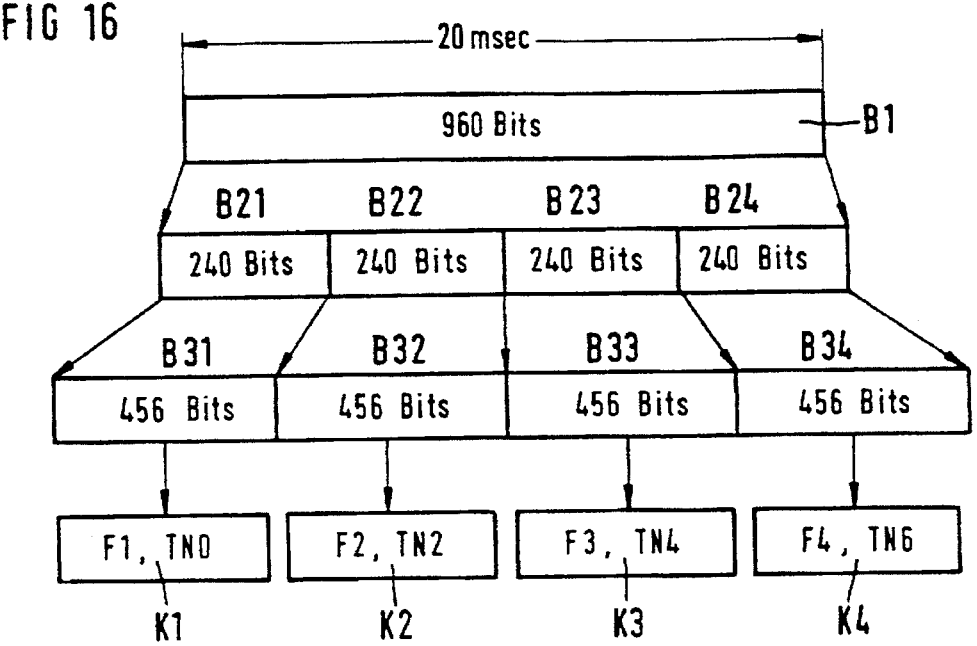
FIG. 16 shows the coding of a channel having a transmission rate of 48.0 kbit/s.

Given the coding shown in FIG. 16 for a transmission rate of 48.0 kbit/s, the data source DS delivers a data stream of 960 bits every 20 ms. This data block can be divided into four sub-blocks B21–B24 with 240 bits each. Each sub-block B21–B24 is supplied to a transmission means for a 12.0 kbit/s channel, and the channel-coded blocks B31–B34 having 456 bits each arise. Subsequently, each 12.0 kbit/s channel K1–K4 is allocated to a timeslot of the multi-channel formed of four channels K1–K4. By way of example, respective time slots of the corresponding multi-channels are shown in FIGS. 12–15. FIG. 16 shows the allocation of the channels for the division shown in FIG. 12. The analogous case applies to the divisions according to FIGS. 13–15.

The following table recites what error-protected and non-error-protected transmission rates are possible in the formation of multi-timeslots and given utilization of the channels for 12.0 kbit/s, 6.0 kbit/s and 3.6 kbit/s that are already present in the system. For the non-error-protected case, a timeslot has a maximum gross data rate of 22.8 kbit/s.

| Plurality of TimeSlots | 12.0 kbit/s | 6.0 kbit/s | 3.6 kbit/s | 22.8 kbit/s |
| --- | --- | --- | --- | --- |
| 1 | 12.0 kbit/s | 6.0 kbit/s | 3.6 kbit/s | 45.6 kbit/s |
| 2 | 24.0 kbit/s | 12.0 kbit/s | 7.2 kbit/s | 68.4 kbit/s |
| 3 | 36.0 kbit/s | 18.0 kbit/s | 10.8 kbit/s | 91.2 kbit/s |
| 4 | 48.0 kbit/s | 24.0 kbit/s | 14.0 kbit/s | 114.0 kbit/s |
| 5 | 60.0 kbit/s | 30.0 kbit/s | 17.2 kbit/s | 136.8 kbit/s |
| 6 | 72.0 kbit/s | 36.0 kbit/s | 20.4 kbit/s | 159.6 kbit/s |
| 7 | 84.0 kbit/s | 42.0 kbit/s | 23.6 kbit/s | 182.4 kbit/s |

Figure 19:
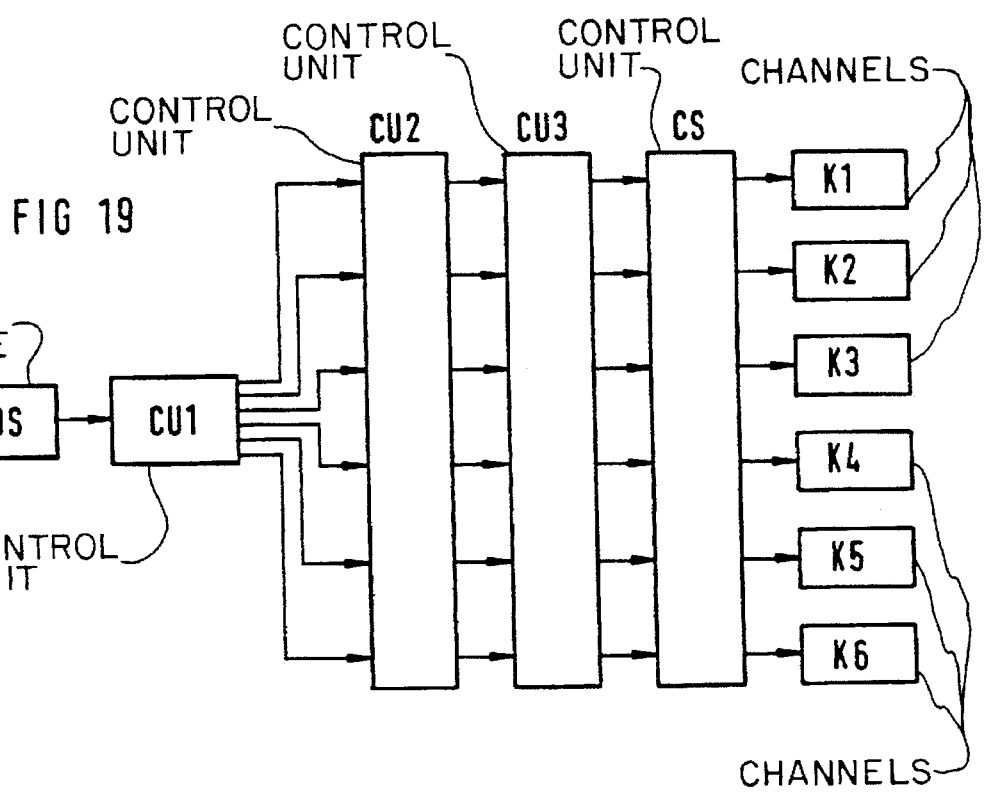
FIG. 19 is a transmission arrangement for a multi-channel for a transmission with a transmission rate of 64.0 kbit/s.

64 kbit/s is a very interesting transmission rate. This transmission rate can be implemented with the existing GSM with the allocation of six channels (timeslots) of 12.0 kbit/s each. As shown in FIGS. 17–19, a data block B1 of 1280 bits is supplied every 20 ms by the data source DS. This block B1 can be divided into six blocks B21–B26, whereby the blocks B21 and B22 each respectively contain 220 bits and the blocks B23–B26 each contain respectively 210 bits. The blocks B21–B26 are expanded with auxiliary bits, so that blocks B21'–B26' having 240 bits each arise. These blocks B21'–B26' are supplied to the transmission means including the channel-coding and interleaving means for the 12.0 kbit/s channel, and the six blocks B31–B36 having 456 bits each are obtained. These blocks B31–B36 are allocated to the individual timeslots of the multi-channel composed of six time slots. The multi-channel can have the configuration shown in FIG. 18, whereby the multi-channel is distributed, for example, onto four frequencies F1, F2, F3 and F5, namely (F1, TN0), (F3, TN1), (F2, TN2), (F1, TN3), (F2, TN5), and (F5, TN5).

A corresponding transmission arrangement is shown simplified in FIG. 19. The data source DS outputs a data stream of 128 bits to the control unit CU1 in respectively 20 ms. The control unit CU1 forms the blocks B1 and forwards these to the control unit CU2 which divides each block B1 into the blocks B21–B26. The control unit CU2 attaches the auxiliary bits and outputs the blocks B21'–B26' that are channel-coded in the coding unit CS, so that the blocks B31–B36 that are allocated to the channels K1–K6 are obtained.

Figure 21:
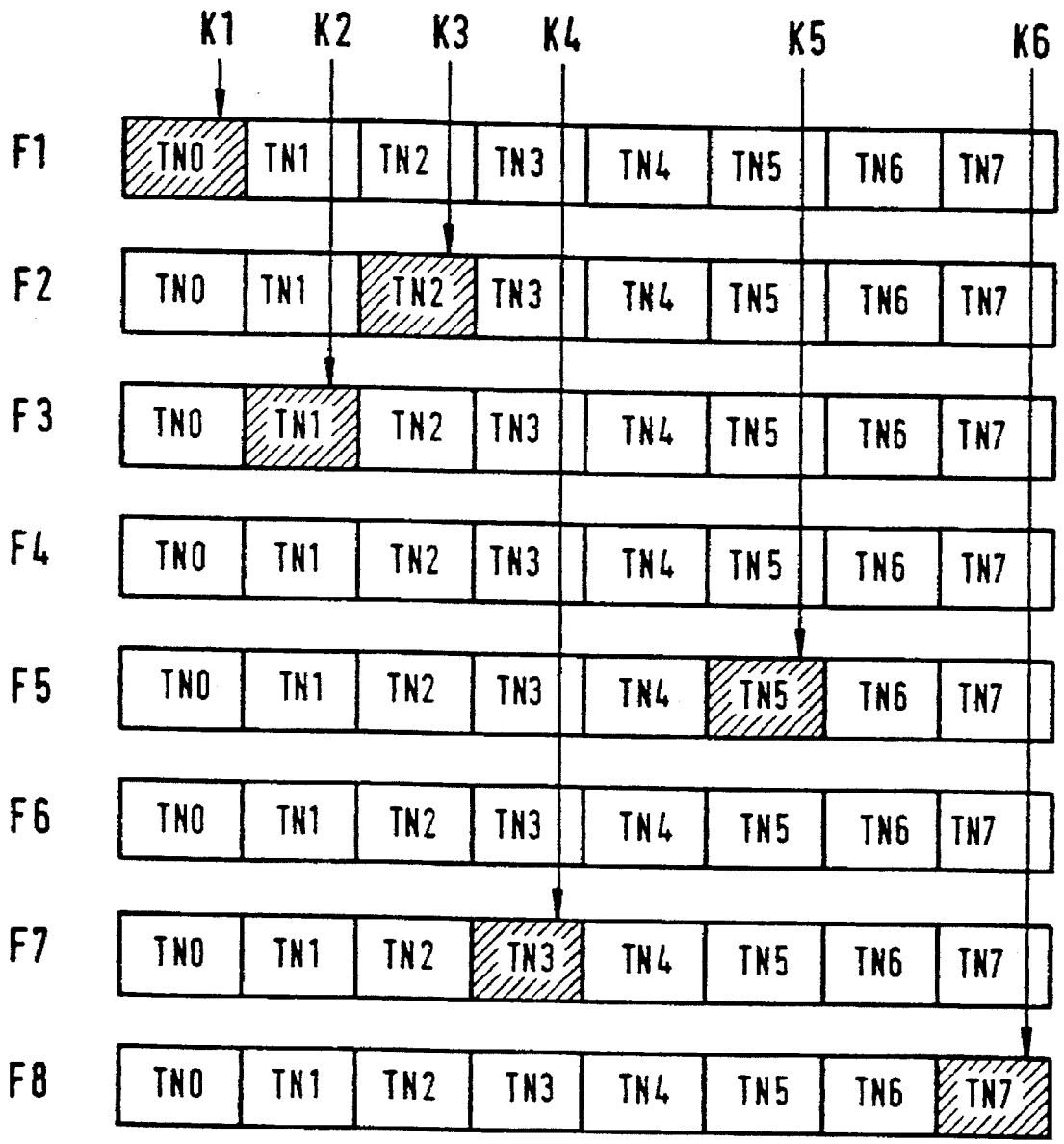
FIG. 21 illustrates a multi-channel for a transmission rate of 64.0 kbit/s formed of six timeslots on six frequencies.

FIGS. 20–22 show a further possibility for the transmission of 64.0 kbit/s. There is also the possibility of employing the plurality of auxiliary bits mainly for error-correcting redundancy. A data block of 1280 bits that is received every 20 ms is in turn divided into six sub-blocks B21–B26. The blocks B21, B22, B24 and B25 contain 213 bits, whereas the blocks B23 and B26 each contain 214 bits. The blocks B21, B22, B24 and B25 are supplemented by an auxiliary bit, so that all blocks contain 214 bits. After this, each block is expanded by error-recognizing or error-correcting redundancy to 240 bits in order to obtain the blocks B31–B36. Upon formation of blocks B31'–B36', each block B31–B36 is supplied to a transmission means for a respective 12.0 kbit/s channel K1–K6, as shown in FIG. 21.

In the arrangement shown in FIG. 22, the data source DS outputs a data stream of 1280 bits every 20 ms to the control unit CU1. The control unit CU1 forms the blocks B1 and forwards these to the control unit CU2 that divides each block B1 into the blocks B21–B26. The control unit CU2 attaches the auxiliary bits in order to form the blocks B21'–B26' of equal length. The coding unit CS1 attaches the channel coding in order to form the blocks B31–B36, and the coding unit CS2 generates the blocks B31'–B36' of the channels K1–K6.

In addition to the fixed allocation of the channels, for example of the data, voice or control channels, to a fixed frequency and to a timeslot TN within a timeslot frame, GSM also employs frequency hopping. The advantage of frequency hopping is that the quality, for example the bit error rate of the transmission channel for slowly moving mobile stations MS, is improved compared to a fixed allocation.

Given a frequency hopping method, the channel can lie on a different frequency from one timeslot frame T to another timeslot frame T; the assigned timeslot number TN, however, is thereby preserved. Since the frequency does not change bit-by-bit but can only change from timeslot frame T to timeslot frame T, this is referred to as a slow frequency hopping.

Figure 23:
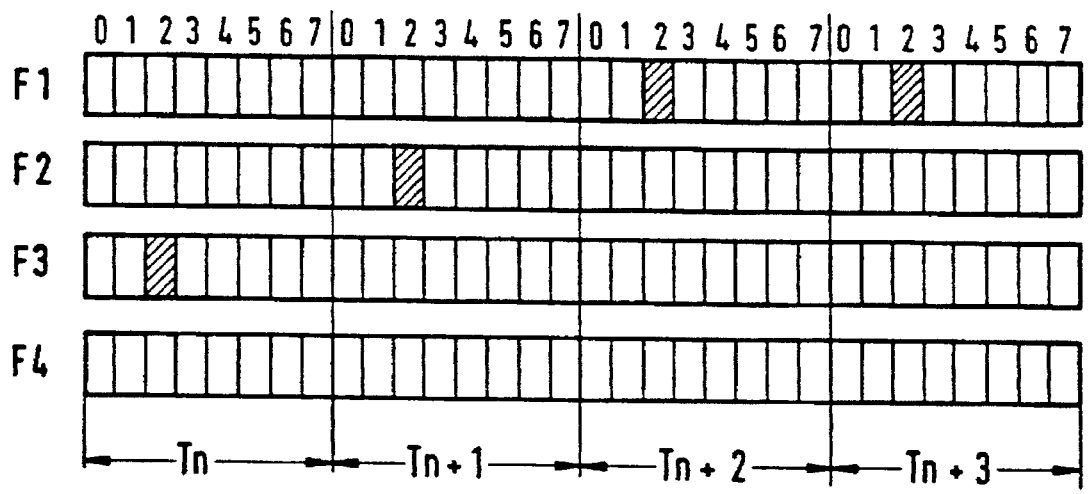
FIG. 23 shows a coding upon employment of a frequency hopping method.

When the frequency hopping method is applied, then the base station controller BSC prescribes over what frequencies and in what sequence hopping should be carried out according to a frequency hopping algorithm. FIG. 23 shows the frequency hopping method for a channel that is assigned to the timeslot TN2 and can hop over four frequencies, being shown for four successive timeslot frames T. The four frequencies read: F1, F2, F3 and F4. The timeslot TN2 lies on the frequency F3 in the timeslot frame Tn, on the frequency F2 in the timeslot frame Tn+1, on F1 thereafter and then again on F1, etc.

Frequency hopping can also be applied to multi-channels. FIGS. 20–22 show a transmission strategy for a transmission with 64 kbit/s. The transmission with 64 kbit/s is implemented upon utilization of a multi-timeslot formed of six timeslots T. On what frequencies and timeslots the multi-channel lies is shown by way of example in FIG. 21. How a possible configuration for four successive timeslot frames can look when the multi-channel formed of six timeslots of a timeslot frame hop over eight frequencies can is recited in the following table. The table is graphically shown in FIG. 24.

|  | TimeSlot | TimeSlot Frame n | TimeSlot Frame n + 1 | TimeSlot Frame n + 2 | TimeSlot Frame n + 3 |
| --- | --- | --- | --- | --- | --- |
| Channel 1 | TN0 | F1 | F1 | F4 | F2 |
| Channel 2 | TN1 | F3 | F4 | F5 | F4 |
| Channel 3 | TN2 | F2 | F2 | F8 | F8 |
| Channel 4 | TN3 | F7 | F2 | F8 | F6 |
| Channel 5 | TN5 | F5 | F3 | F6 | F4 |
| Channel 6 | TN7 | F8 | F3 | F3 | F7 |

Figure 25:
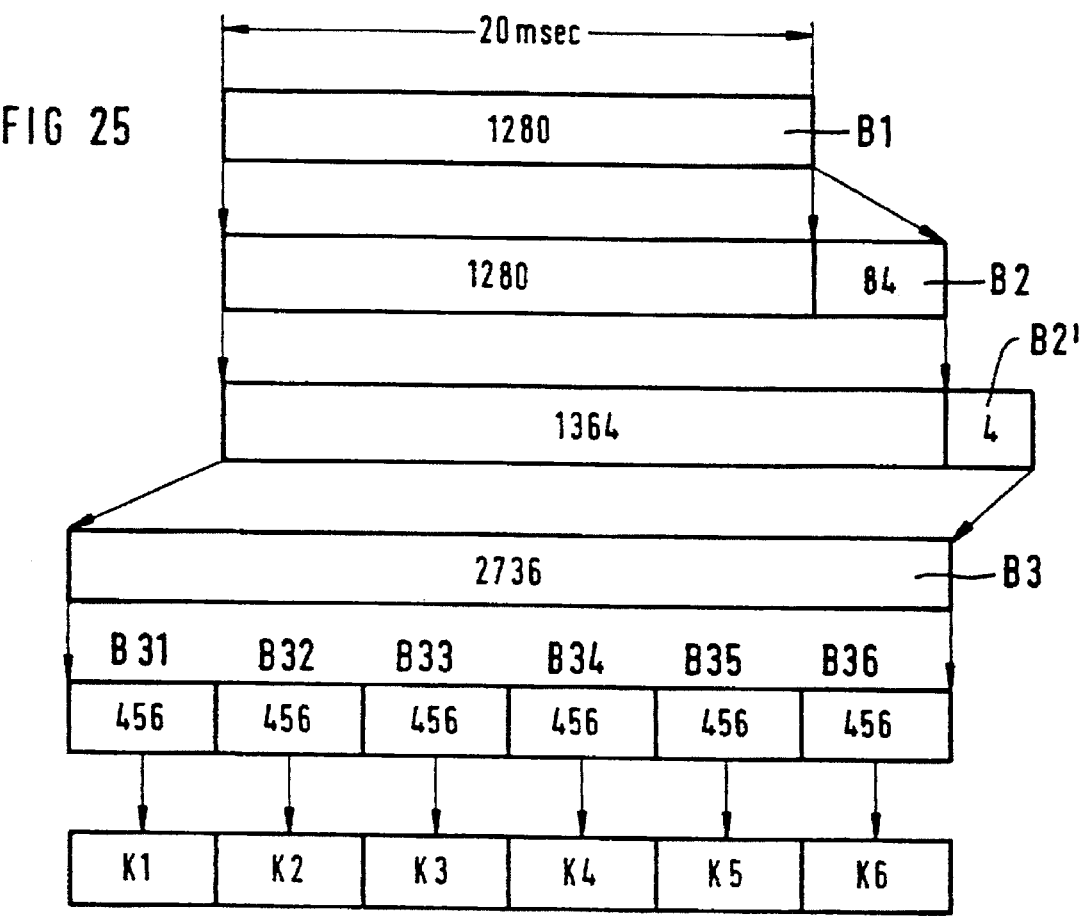
FIG. 25 is a further coding of a channel having a transmission rate of 64.0 kbit/s.
Figure 26:
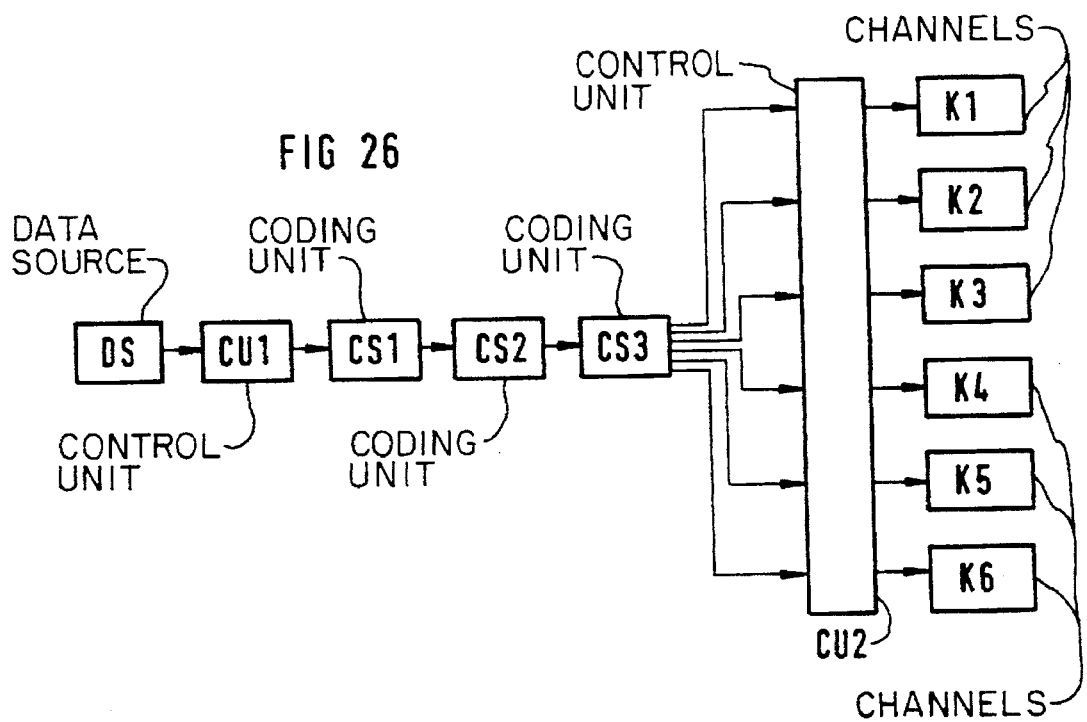
FIG. 26 is a further transmission arrangement for a multi-channel for a transmission having a transmission rate of 64.0 kbit/s.

FIGS. 25 and 26 show a further possibility of the transmission. The data stream of respectively 1280 bits received from the data source in 20 ms is thereby subjected to a chained channel-coding pattern (block and convolution coding) and is subsequently distributed onto six timeslots. A block B2 is formed by a channel coding in the coding unit CS1 from a block B1 generated in the control unit CU1. A coding unit CS2 attaches auxiliary bits and forms the block B2'. A convolution coding occurs in a coding unit CS3 and the block B3 is formed. A control unit CU2 generates the blocks B31–B36 therefrom, these being allocated to the channels K1–K6.

Figure 27:
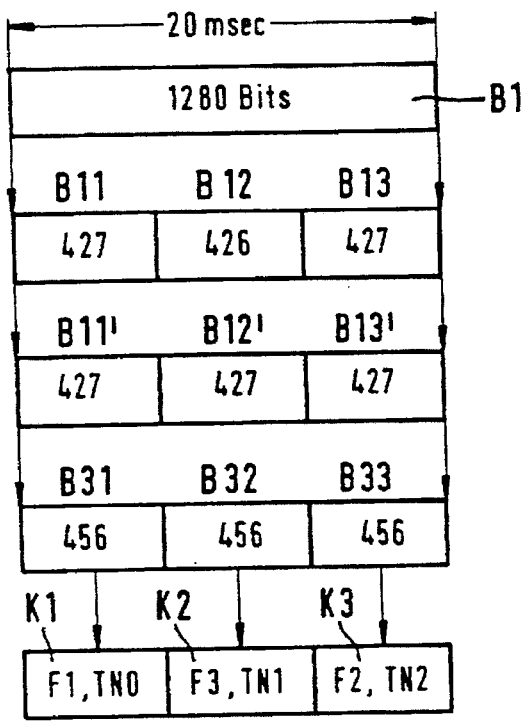
FIG. 27 is yet another coding of a channel having a transmission rate of 64.0 kbit/s.
Figure 28:
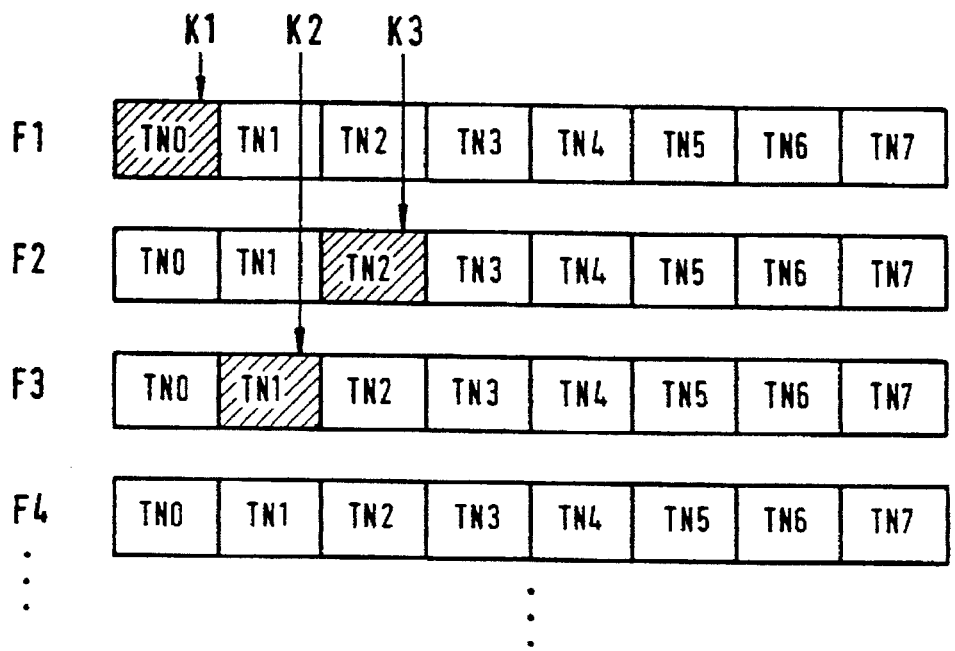
FIG. 28 is a multi-channel for a transmission rate of 64.0 kbit/s formed of three timeslots on three frequencies.
Figure 29:
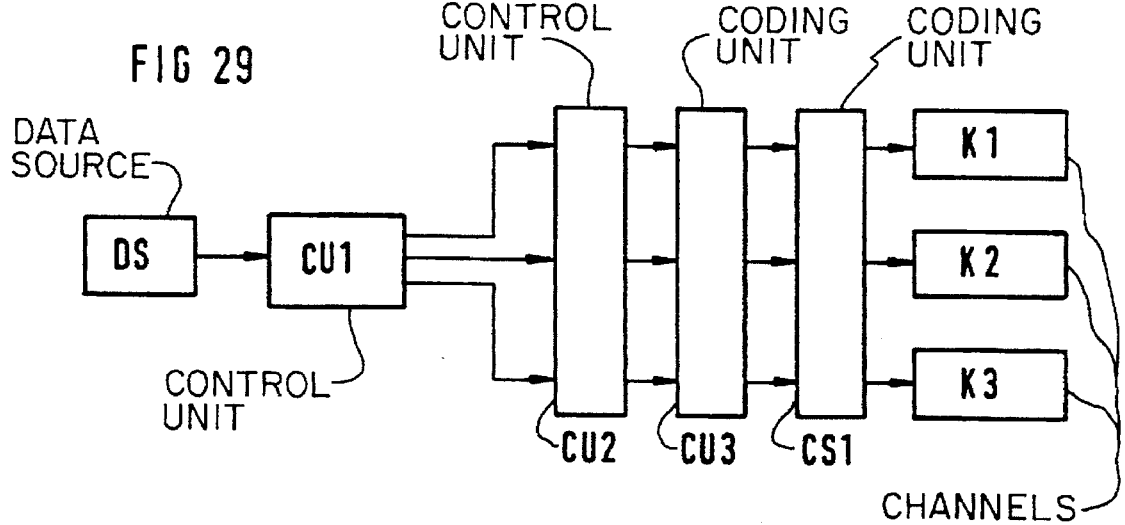
FIG. 29 is yet another transmission arrangement for a multi-channel for a transmission having a transmission rate of 64.0 kbit/s.

Another possibility for transmitting 64 kbit/sec is shown in FIGS. 27–33. An allocation of three or four timeslots occurs therein. In the case of three timeslots, as shown in FIGS. 27–29, the 1280 bits of the block B1 are divided into three blocks B11, B12 and B13, whereby the block B12 contains 426 bits and the blocks B11 and B13 each contain 427 bits. The block B12 is expanded with an auxiliary bit. All three blocks B11'–B13' are then supplied to a channel coding means that attaches 29 bits of redundancy to every block, so that each block B31–B33 contains a total of 456 bits. After this, each block is allocated to an interleaving means of a timeslot and is transmitted in a timeslot, as shown by way of example in FIG. 28.

Given the transmission arrangement shown in FIG. 29, the data source DS outputs a data stream of 1280 bits to the control unit CU1 in respectively 20 ms. The control unit CU1 forms the blocks B1 and forwards these to the control unit CU2 which resolves each block B1 into the blocks B11–B13. The control unit CU3 attaches the auxiliary bits in order to form the blocks B11'–B13' with 427 bits each. The coding unit CS1 attaches the channel coding in order to form the blocks B31–B33 that represent the channels K1–K3.

Figure 30:
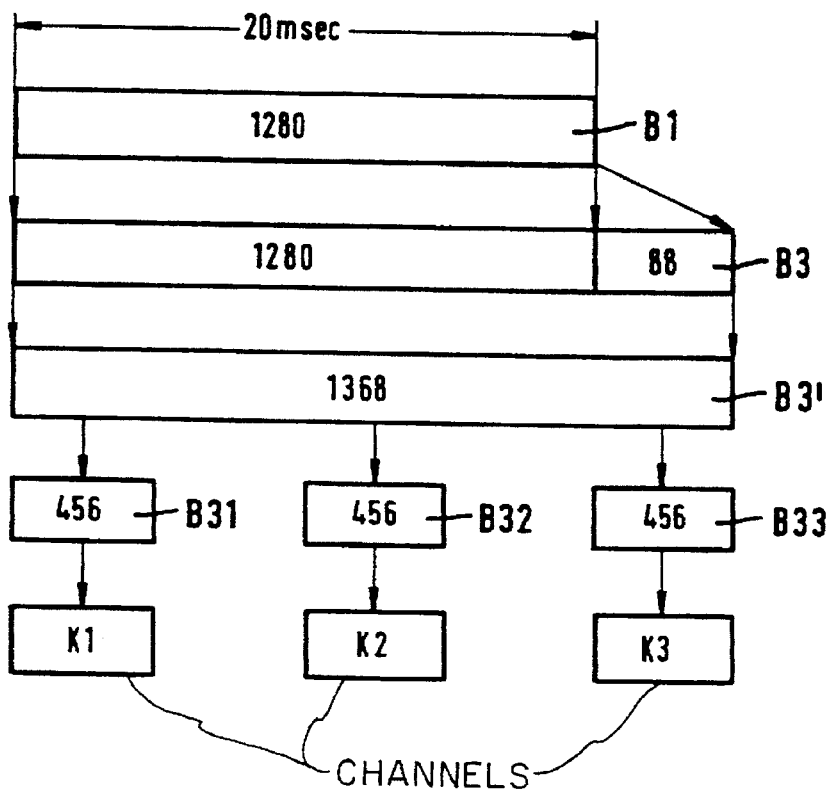
FIG. 30 is a further coding of a channel having a transmission rate of 64.0 kbit/s.
Figure 31:
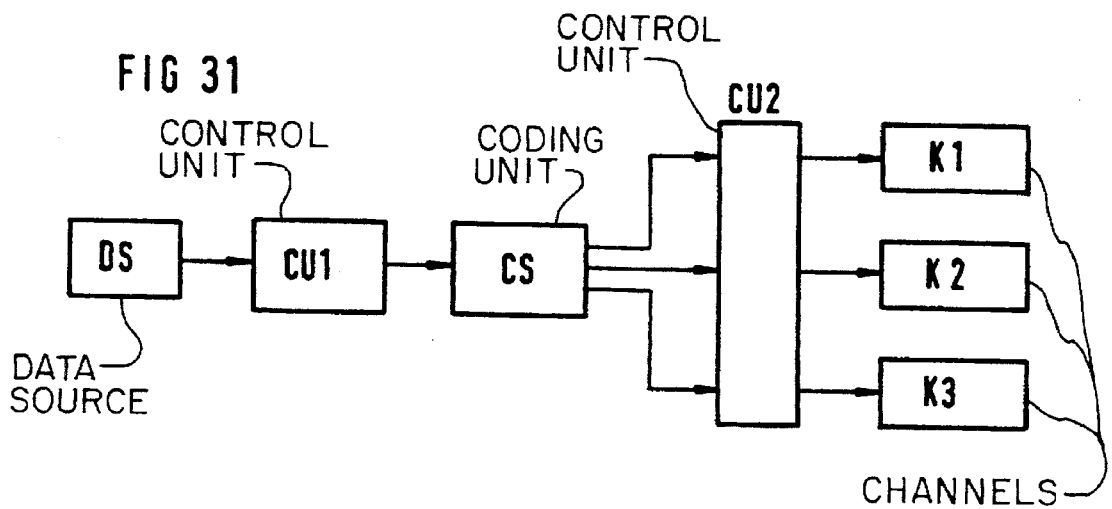
FIG. 31 is a schematic illustration of a further transmission arrangement for a multi-channel for a transmission with a transmission rate of 64.0 kbit/s.

It is shown in FIGS. 30 and 31 that the entire data block B1 of 1280 bits is channel-coded, resolved into blocks B31–B33 and transmitted in three time slots.

Given the transmission arrangement shown in FIG. 31, the control unit CU1 forms the blocks B1 and forwards these to the coding unit CS1 that channel-codes each block B1. A control unit CU2 generates the blocks B31–B33 that represent the channels K1–K3.

In the case of four time slots, the 1280 bits are resolved into four blocks of 320 bits each. As a result of the channel coding, 136 bits of redundancy are attached to each block and each block then has 456 bits. After this, each block composed of 456 bits is allocated to a time slot and transmitted.

Figure 32:
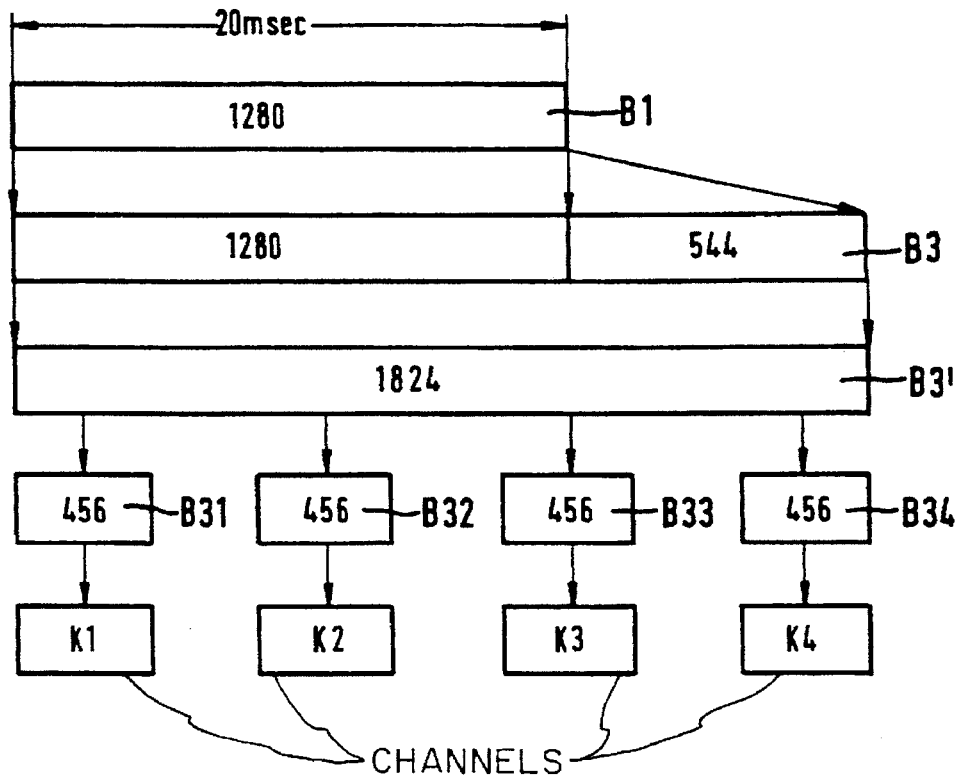
FIG. 32 is a further coding of a channel with a transmission rate of 64.0 kbit/s.
Figure 33:
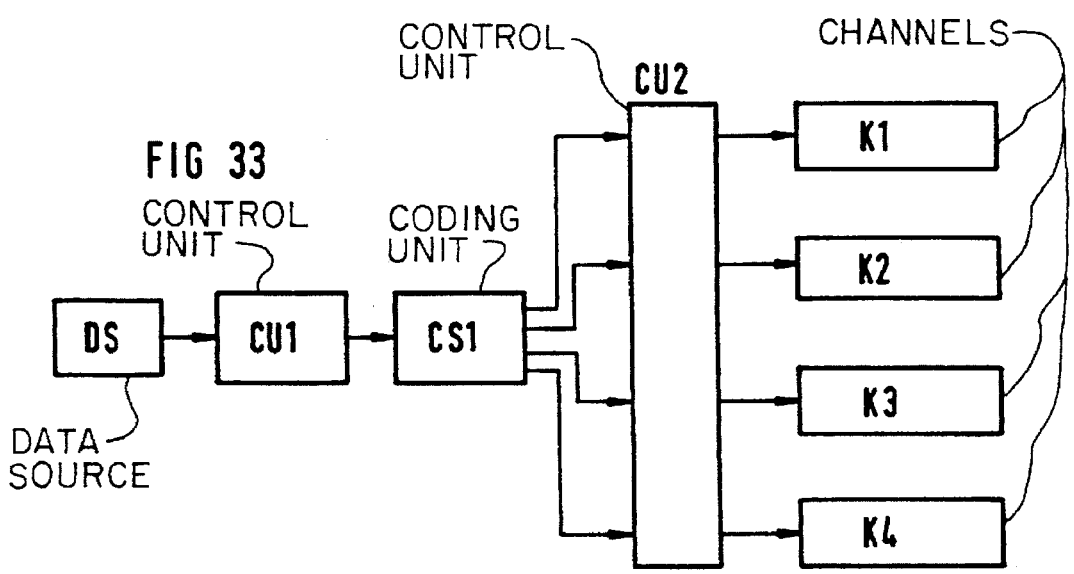
FIG. 33 shows a schematic illustration of a further transmission arrangement for a multi-channel for a transmission with a transmission rate of 64.0 kbit/s.

It is shown in FIGS. 32 and 33 that the entire data block of 1280 bits is channel-coded and the block B3 is formed in this way. This is resolved into four blocks B31–B34 and divided onto four time slots.

Given the transmission arrangement shown in FIG. 33, the data source DS again outputs a data stream of 1280 bits to the control unit CU1 every 20 ms. The control unit CU1 forms the blocks B1 and forwards these to the coding unit CS1 that channel-codes each block B1 upon attachment of 544 bits. The coded block B3' is then resolved into the blocks B31–B33 in the coding unit CS2, these blocks B31–B33 being then allocated to the channels K1–K3.

Further divisions can be implemented in order to transmit a data stream in a multi-channel formed of a plurality of channels. In any case, it is possible to obtain a coding and division matched to the respective application. In the present exemplary embodiments, the channels of a multi-channel respectively had timeslots of a time-division multiplex system allocated to them, these to be viewed as being logical channels. However, it is also possible to use other logical or physical channels such as, for example, frequencies for the formation of multi-channels.

In the transmission of an error-protected 64 kbit/s data channel upon utilization of the error-protected 12 kbit/s data channel existing in the GSM, a multi-timeslot MTN composed of six timeslots TN of a timeslot frame TF can be used. In order to match the data of the 64 kbit/s channel to the format of the 12 kbit/s data channel (240 bits per 20 msec), redundancy bits for error recognition or error correction and/or filler bits were added, as shown in FIGS. 17–20 and 20–22.

By collecting the data over a longer time span, for example over a multiple of 20 msec, for example 40 msec or 60 msec, there is the possibility of reducing the plurality of required timeslots T upon utilization of the 12 kbit/s data channel for a 64 kbit/s transmission. The reduction can be accomplished in that multi-channels or multi-time slots are formed that extend over a plurality of timeslot frames (multi-timeslot frame).

The timeslots that have become free within a multi-timeslot frame in the distribution of the data over a plurality of timeslot frames can be used for other subscribers or a data or a voice service for the same mobile radio telephone subscriber that is additional to the 64 kbit/s data service which can be offered in the timeslots that have become free.

Figure 34:
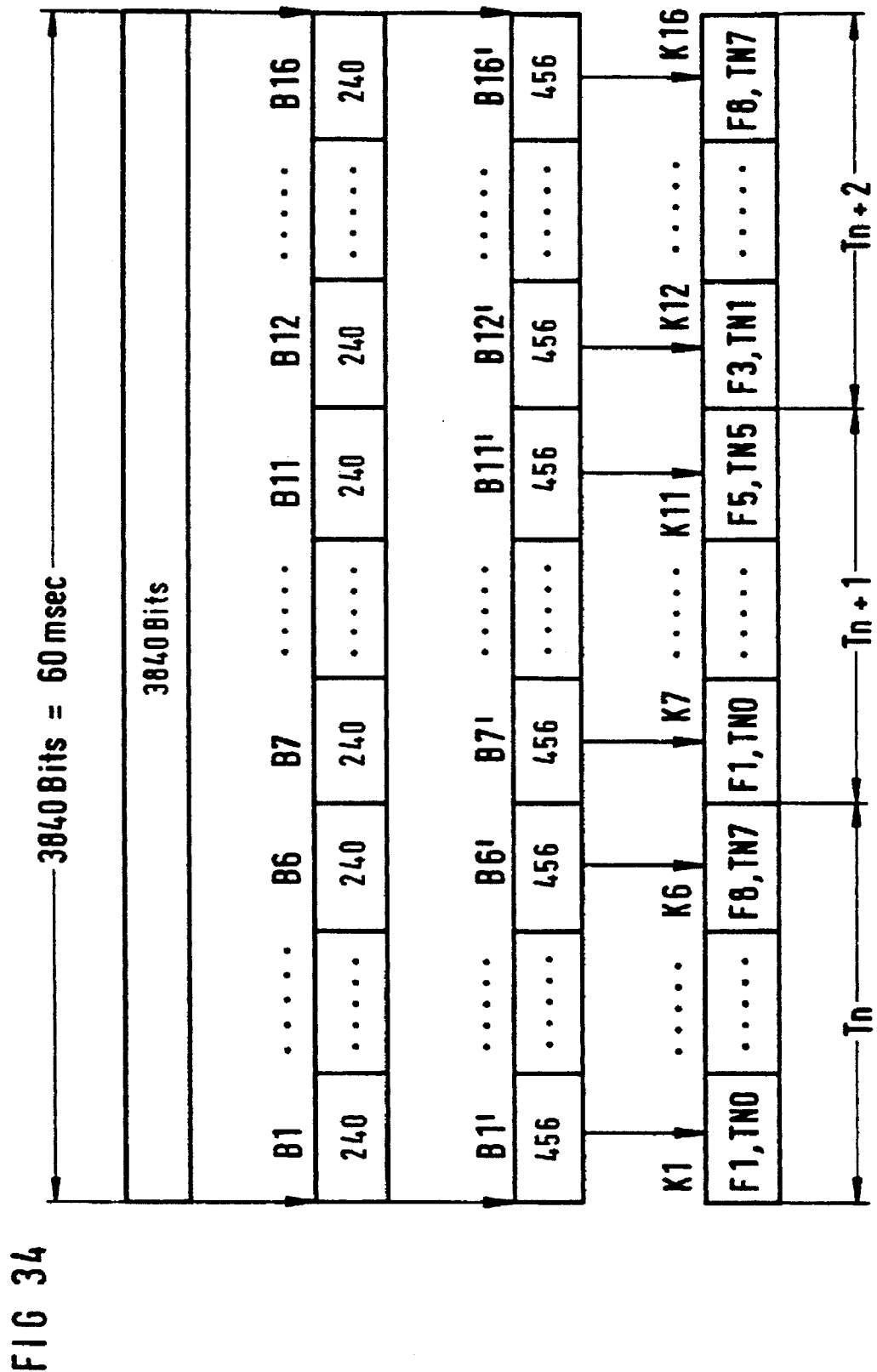
FIG. 34 is a coding of a channel with a transmission rate of 64.0 kbit/s without additional filler bits or redundancy bits.
Figure 35:
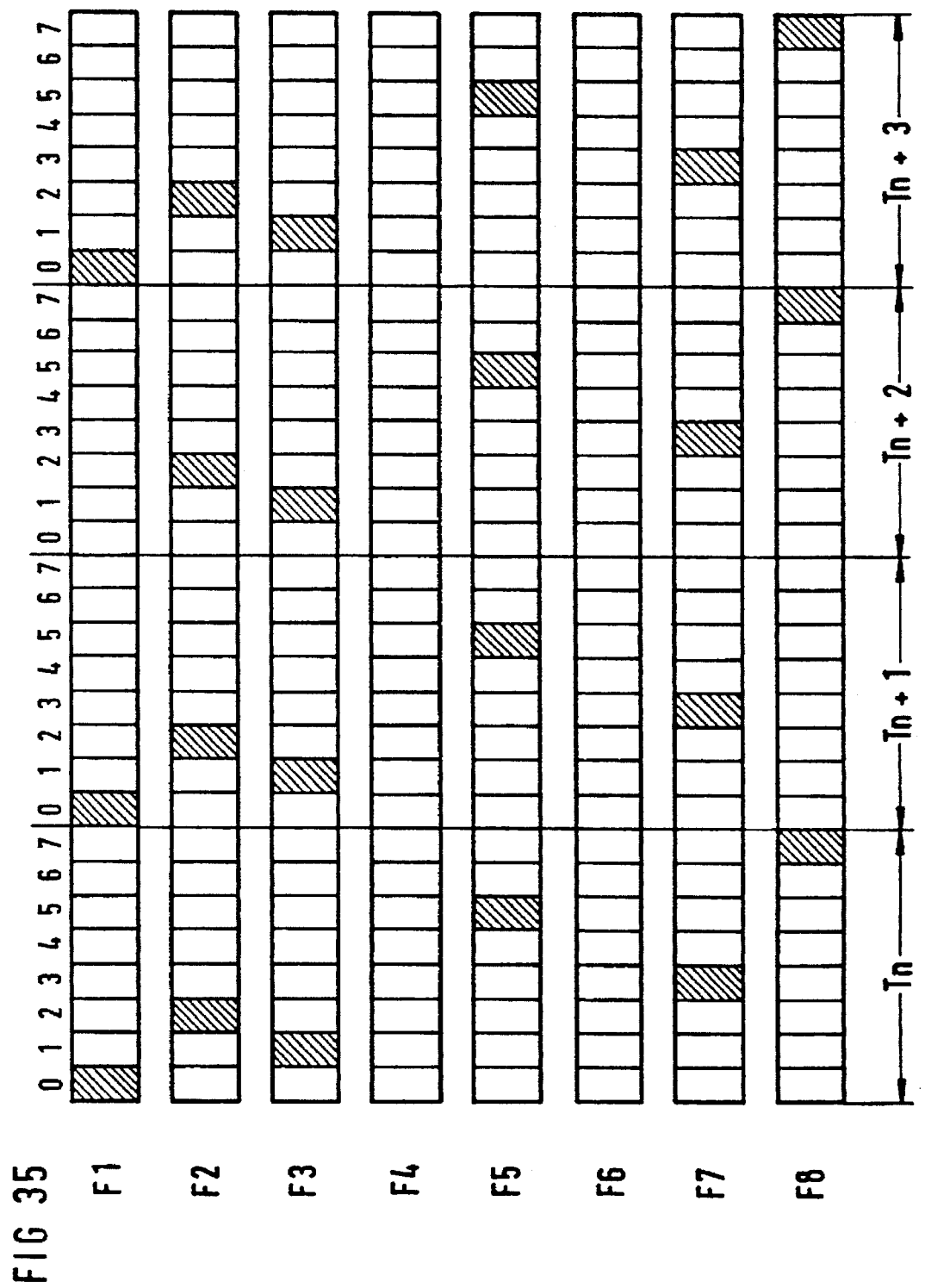
FIG. 35 is a division of 16 channels onto eight frequencies.
Figure 36:
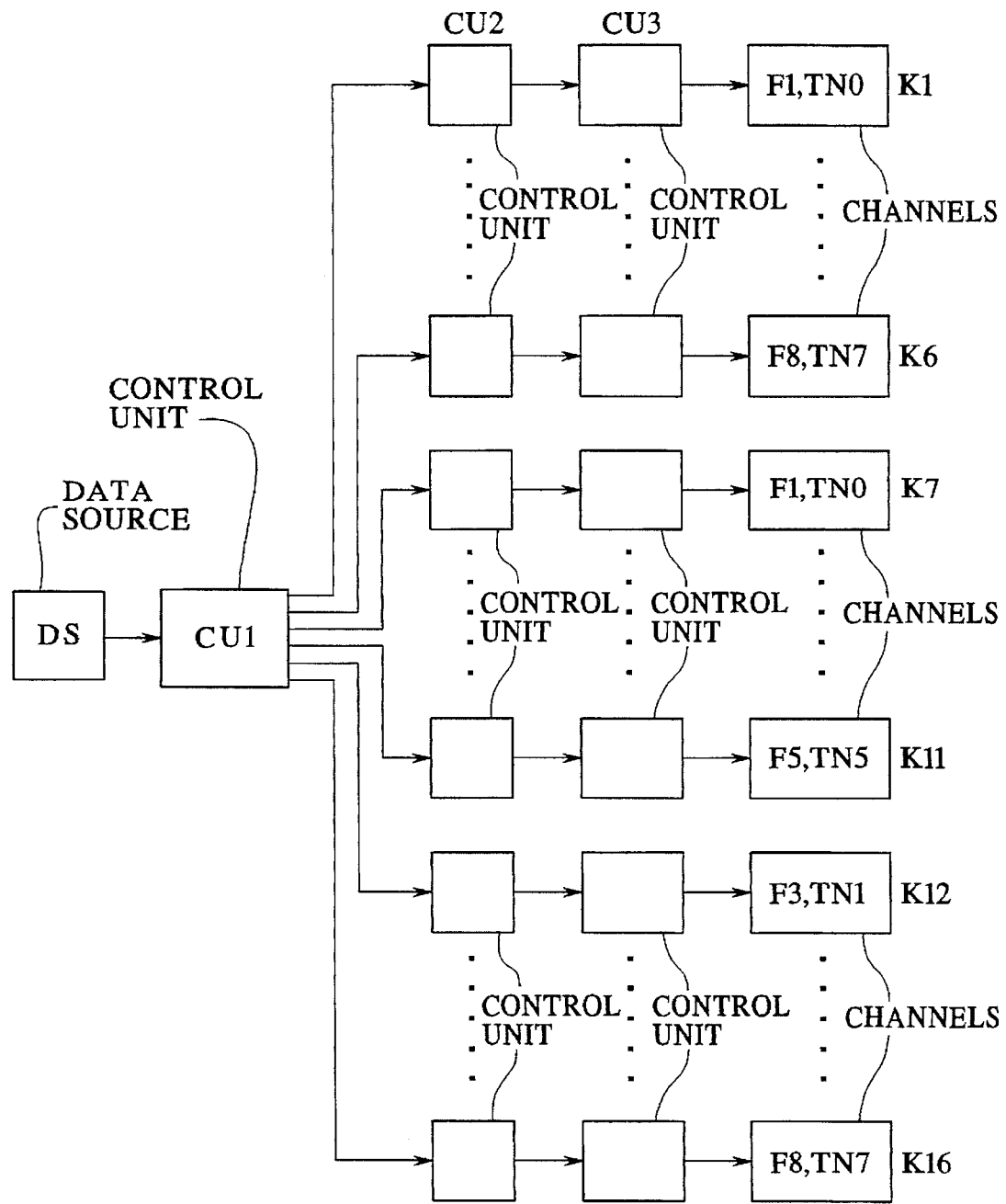
FIG. 36 is a transmission arrangement for a transmission with 64 kbit/s.

How 64 kbit/s can be transmitted upon utilization of the 12 kbit/s data channel already existing without additional filler bits or redundancy bits is shown in FIGS. 34–36. A data block of 3840 bits that is obtained every 60 msec is thereby divided into 16 sub-blocks B. The sub-blocks B1–B16 each respectively contain 240 bits. Subsequently, each sub-block B is supplied to a transmission means for respectively 112 kbit/s channel K1–K16. Timeslots in the timeslot frame Tn are thereby assigned to the first six channels K1–K6, timeslots in the following time slot frame Tn+1 are assigned to the channels K7–K11, and timeslots in the time slot frame Tn+2 are assigned to the last five channels K12–K16. The fact that the smallest common multiple of 64 and 12 is equal to 192 since 3·64 =16·12 has been exploited in this transmission method for a 64 kbit/s transmission.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for transmitting information in a digital radio communication system, comprising the steps of:

digitally coding information items assigned to a subscriber of the digital radio communication system block-by-block at a transmission side, and wherein each block is divided into a plurality of further blocks;

transmitting each further block via the digital radio communication system in respective channels of a multi-channel composed of a plurality of channels, said channels being time slots of a time slot frame of a time-division multiplex system; and at a reception side of the digital radio communication system, combining and outputting said further blocks transmitted in the time slots of the time slot frame.

2. A method according to claim 1 including the step of designing the digital radio communication system as a global system of mobile communication where base stations receive and mobile stations transmit in a first band and base stations transmit and mobile stations receive in a second band.

3. A method according to claim 1 including the step of operating the digital radio communication system as a mobile radio telephone system with time division multiple access where mobile radio telephone subscribers are differentiated by different time slots in a time division multiplex system.

4. A method according to claim 1 including the step of allocating a separate physical channel to each time slot serving as a channel of the multi-channel, wherein the information items are resolved into sub-blocks, are filled with auxiliary bits and are channel coded.

5. A method according to one of the claim 1, including the step of allocating a separate physical channel to each time slot serving as a channel of the multi-channel, wherein the information items are resolved into sub-blocks, are supplemented by redundancy for error recognition or error correction and are channel coded, and which is allocated to a time slot of a multi-time slot.

6. A method according to claim 1, including the step of collecting the information items to be transmitted block-by-block, channel coding them, resolving them into sub-blocks, and allocating them to the time slots of the multi-channel.

7. A method according to claim 1 wherein channels forming the multi-channel each respectively comprise the same structure.

8. A method according to claim 7, wherein the channels each respectively comprise a training sequence, control bits, auxiliary bits and a guard period.

9. A method according to claim 1 wherein the channels are logical channels of a mobile radio telephone system.

10. A method according to claim 1 wherein the channels respectively forming a multi-channel lie on one frequency.

11. A method according to claim 1 wherein channels after each time slot frame the channels are allocated to a different frequency.

12. A method according to claim 11, wherein the channels after each timeslot frame lie on the different frequency according to a predetermined algorithm having predetermined starting conditions.

13. A method according to claim 12, including the step of defining starting conditions before a transmission between a mobile station and a base station controller.

14. A method according to claim 12, wherein the channels after each time slot frame lie on the different frequency according to a predetermined sequence.

15. A method according to claim 1 including the step of generating a multiple of frames in a transmission; resolving the frame into sub-blocks; supplying each sub-block to a channel, with each channel occupying a timeslot; forming a multi-channel of these timeslots; and distributing the multi-channel over a plurality of timeslots.

16. A method according to claim 15, including the step of employing the remaining channels for a voice transmission.

17. An arrangement for transmission of information in a digital radio communication system, comprising:

a transmission side of the digital radio communication system digitally coding block-by-block information items assigned to a subscriber of the digital radio communication system and which are to be transmitted in channels;

said transmission side having means for dividing each block into a plurality of further blocks and for allocating each further block to time-slots of a time-slot frame formed of a plurality of channels; and a reception side of the digital radio communication system for recovering the transmitted blocks.

18. A mobile station for transmission of information in a digital radio communication system, comprising:

a transmission side of the mobile station for digitally coding information items assigned to a subscriber of the digital radio communication system block-by-block; and said transmission side in the mobile station having means for dividing each block into a plurality of further blocks and for allocating each further block to respective time-slots of a time-slot frame composed of a plurality of time-slots and for transmitting the further blocks in the time-slots for reception at a reception side where the blocks are recovered.

* * * * *